United States Patent
Oka et al.

(10) Patent No.: US 11,214,304 B2
(45) Date of Patent: Jan. 4, 2022

(54) STEERING CONTROL APPARATUS

(71) Applicant: DENSO CORPORATION, Kariya (JP)

(72) Inventors: Atsuko Oka, Kariya (JP); Nobuyori Nakajima, Kariya (JP); Go Endoh, Kariya (JP); Koichi Nakamura, Kariya (JP); Yosuke Ogi, Kariya (JP)

(73) Assignee: DENSO CORPORATION, Kariya (JP)

( * ) Notice: Subject to any disclaimer, the term of this patent is extended or adjusted under 35 U.S.C. 154(b) by 232 days.

(21) Appl. No.: 16/264,282

(22) Filed: Jan. 31, 2019

(65) Prior Publication Data

US 2019/0241214 A1    Aug. 8, 2019

(30) Foreign Application Priority Data

Feb. 5, 2018 (JP) .............................. JP2018-018126
Nov. 27, 2018 (JP) .............................. JP2018-220992

(51) Int. Cl.
*H02P 21/22* (2016.01)
*B62D 6/10* (2006.01)
(Continued)

(52) U.S. Cl.
CPC .............. *B62D 6/10* (2013.01); *B62D 5/0403* (2013.01); *B62D 5/046* (2013.01); *B62D 5/0463* (2013.01); *B62D 15/025* (2013.01); *H02K 1/00* (2013.01); *H02P 7/00* (2013.01); *H02P 21/22* (2016.02); *H02P 25/22* (2013.01); *H02P 21/36* (2016.02); *H02P 21/50* (2016.02)

(58) Field of Classification Search
CPC ........ B62D 6/10; B62D 5/0403; B62D 5/046; B62D 5/0463; H02P 21/22; H02P 7/00; H02P 25/22; H02P 21/36; H02P 21/50; H02K 1/00
See application file for complete search history.

(56) References Cited

U.S. PATENT DOCUMENTS

| 10,059,367 | B2 * | 8/2018 | Sone ................... | B62D 5/0481 |
| 2013/0299271 | A1 * | 11/2013 | Endo ................... | B62D 5/046 |
| | | | | 180/446 |

(Continued)

FOREIGN PATENT DOCUMENTS

| JP | 6004145 B1 | 10/2016 | |
| WO | 2018088463 A1 | 5/2018 | |
| WO | WO-2018088463 A1 * | 5/2018 | .............. B62D 6/00 |

*Primary Examiner* — Mahmoud S Ismail
*Assistant Examiner* — Gabriel Anfinrud
(74) *Attorney, Agent, or Firm* — Maschoff Brennan

(57) ABSTRACT

Inverter circuits are provided for motor winding sets, respectively. Control units are provided for the motor winding sets to generate control signals related to driving of the inverter circuits and control currents flowing through the motor winding sets, respectively, thereby controlling driving of a motor. The control mode includes a manual steering mode for controlling the motor according to a steering operation on a steering wheel by a driver and an automatic steering mode for controlling the motor independently of the steering operation on the steering wheel by the driver. The control units are capable of switching the control modes and differentiate the current control according to the control mode. By making the current control different according to the control mode, it is possible to attain optimal characteristics which correspond to each control mode.

16 Claims, 21 Drawing Sheets

(51) Int. Cl.
*H02P 7/00* (2016.01)
*H02P 25/22* (2006.01)
*B62D 5/04* (2006.01)
*B62D 15/02* (2006.01)
*H02K 1/00* (2006.01)
*H02P 21/36* (2016.01)
*H02P 21/00* (2016.01)

(56) References Cited

U.S. PATENT DOCUMENTS

| | | | |
|---|---|---|---|
| 2016/0001810 A1* | 1/2016 | Tsubaki | B62D 6/08 |
| | | | 701/42 |
| 2017/0274928 A1 | 9/2017 | Minaki et al. | |
| 2017/0282966 A1* | 10/2017 | Fukuda | B62D 5/0463 |
| 2017/0346424 A1* | 11/2017 | Pramod | B62D 5/0463 |
| 2018/0170421 A1* | 6/2018 | Minaki | B62D 15/021 |
| 2019/0016378 A1* | 1/2019 | Itou | H02P 5/46 |
| 2019/0039647 A1* | 2/2019 | Tsubaki | B62D 15/025 |

\* cited by examiner

STEERING CONTROL APPARATUS

CROSS REFERENCE TO RELATED APPLICATION

The present application is based on Japanese patent applications No. 2018-18126 filed on Feb. 5, 2018 and No. 2018-220992 filed on Nov. 27, 2018, the whole contents of which are incorporated herein by reference.

FIELD

The present disclosure relates to a steering control apparatus.

BACKGROUND

Conventionally, an electric power steering apparatus (EPS) capable of switching its operation mode between automatic steering control and manual steering control is known. For example, an operation mode is smoothly switched by gradually changing a control torque for torque control and a command value for position/speed control.

SUMMARY

A steering control apparatus according to the present disclosure controls an electric power steering apparatus, which is provided with a rotary electric machine, comprises a driving circuit and a control unit. The control unit controls driving of the rotary electric machine by generating a control signal related to driving of the driving circuit and controlling a current flowing in the rotary electric machine. The control unit switches a control mode, which includes a manual steering mode and an automatic steering mode, and differentiate current control in correspondence to the control mode.

DETAILED DESCRIPTION OF EMBODIMENTS

Figure 1:
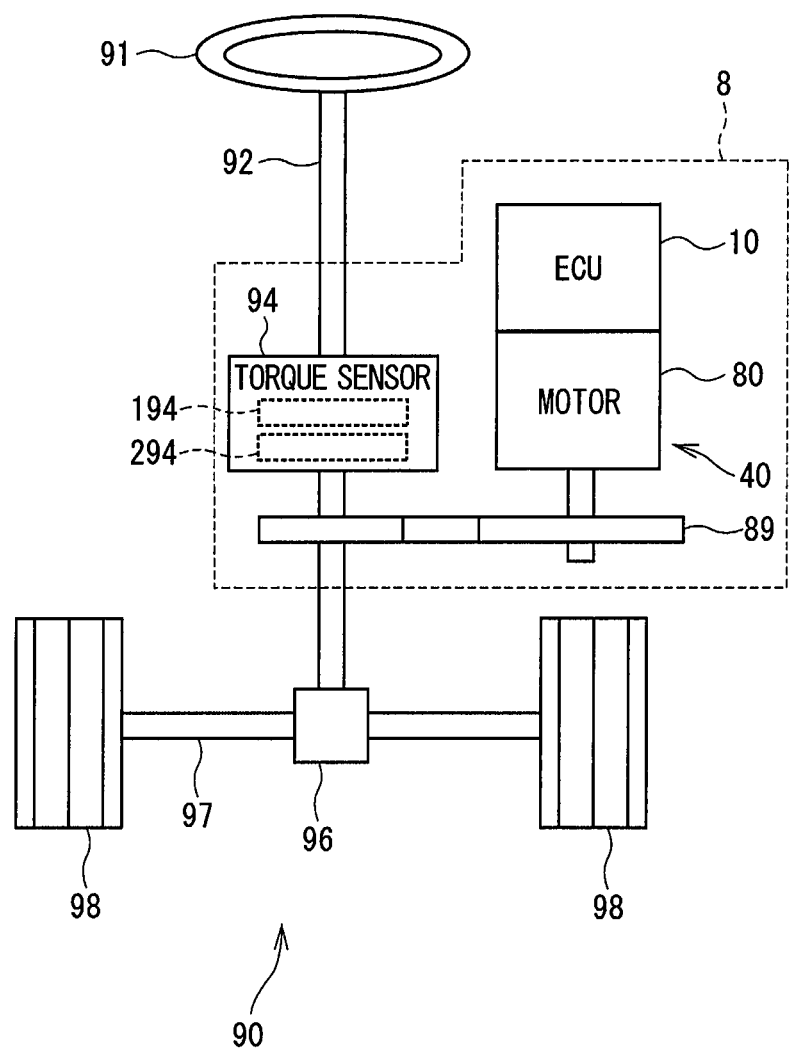
FIG. 1 is a schematic diagram showing a steering system incorporating an electric power steering apparatus according to a first embodiment.

A steering control apparatus according to the present disclosure will be described in detail with reference to the accompanying drawings. In the following embodiments, substantially same structural component parts are designated with the same reference numerals thereby to simplify the description.

First Embodiment

A first embodiment is shown in FIG. 1 to FIG. 16. As shown in FIG. 1, an EPS-ECU 10 is provided as a steering control apparatus according to the present embodiment and is applied to an electric power steering apparatus 8, which assists a steering operation of a vehicle, together with a motor 80 provided as a rotary electrical machine. Hereinafter, the EPS-ECU 10 will be simply referred to as an ECU 10. FIG. 1 shows an overall configuration of a steering system 90 including the electric power steering apparatus 8. The steering system 90 includes a steering wheel 91, a steering shaft 92, a pinion gear 96, a rack shaft 97, road wheels 98 and the electric power steering apparatus 8.

The steering wheel 91 is connected to the steering shaft 92. A torque sensor 94 is provided at a portion of the steering shaft 92 to detect a steering torque Ts. At the end of the steering shaft 92, the pinion gear 96 is provided. The pinion gear 96 meshes with the rack shaft 97. A pair of road wheels 98 is coupled at both ends of the rack shaft 97 via, for example, tie rods.

In a manual steering mode, when a driver of the vehicle rotates the steering wheel 91, the steering shaft 92 connected to the steering wheel 91 rotates. The rotational motion of the steering shaft 92 is converted into a linear motion of the rack shaft 97 by the pinion gear 96. The pair of road wheels 98 is steered to an angle corresponding to the displacement amount of the rack shaft 97. In an automatic steering mode, the steering amount of the road wheels 98 is controllable by a driving force of the motor 80 without depending on a manual operation of the steering wheel 91 by the driver. The automatic steering mode is also referred to as an automatic driving mode.

The electric power steering apparatus 8 includes a driving device 40, which includes the motor 80 and the ECU 10, a reduction gear 89 or the like as a power transmission mechanism which reduces the rotation of the motor 80 and transmits the motor rotation to the steering shaft 92. The electric power steering apparatus 8 is a column assist type. It may alternatively be a rack assist type which transmits the rotation of the motor 80 to the rack shaft 97. The steering shaft 92 corresponds to a driven object.

The motor 80 outputs a whole or a part of an assist torque required for a steering operation. The motor 80 is driven by electric power supplied from two batteries 191 and 291 (see FIG. 6) which are direct current power supply sources to rotate the reduction gear 89 in forward and reverse directions. The motor 80 is a three-phase brushless motor and has a rotor 860 and a stator 840 (see FIG. 4).

Figure 2:
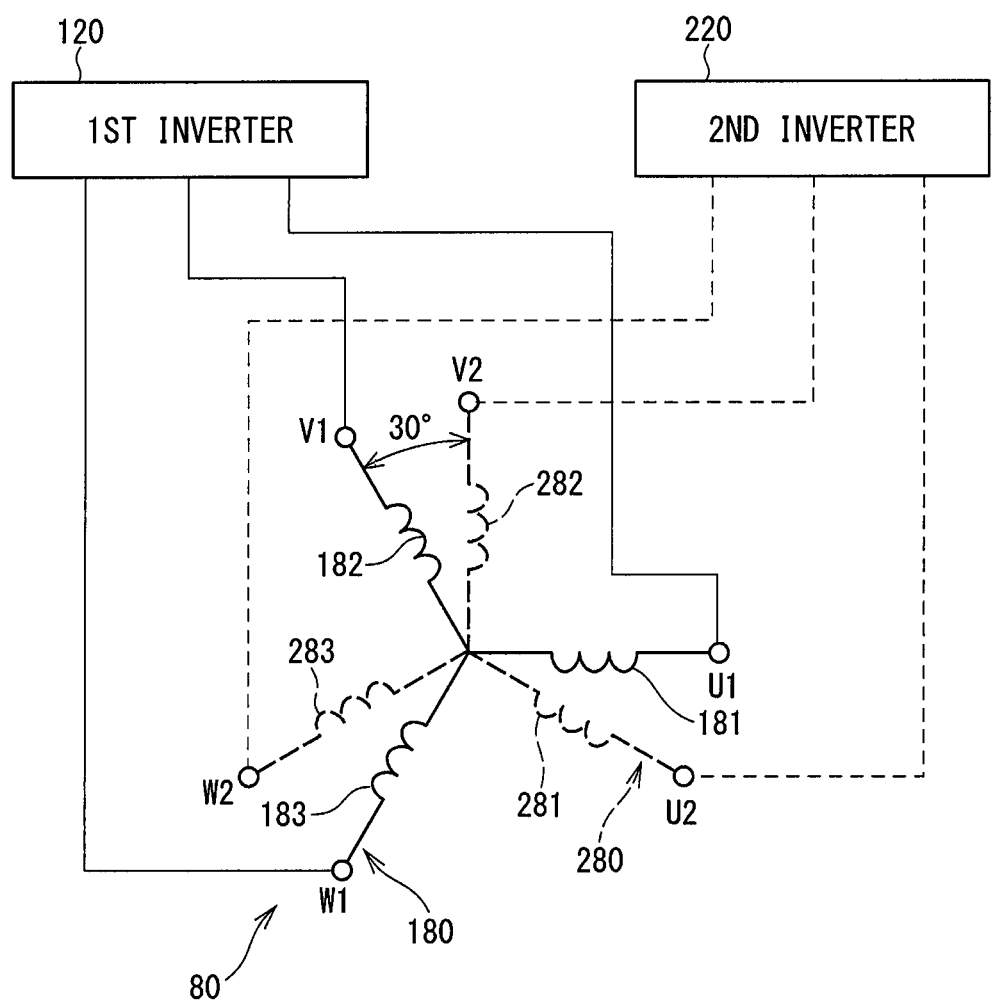
FIG. 2 is a schematic diagram showing motor winding sets in the first embodiment.
Figure 6:
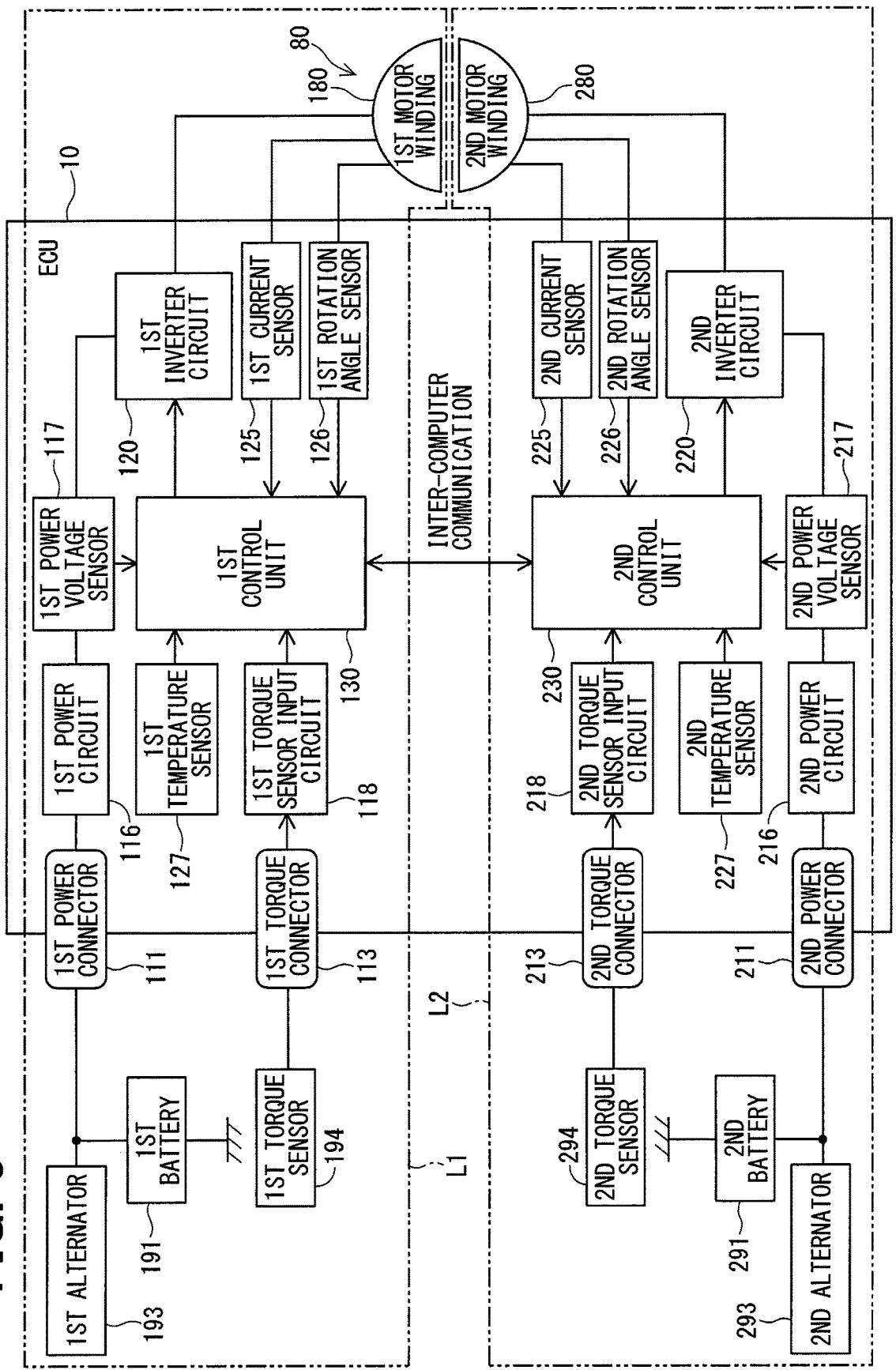
FIG. 6 is a block diagram showing an EPS-ECU in the first embodiment.

As shown in FIG. 2, the motor 80 has a first motor winding set 180 and a second motor winding set 280. The first motor winding set 180 includes a U1 coil 181, a V1 coil 182 and a W1 coil 183. The second winding set 280 includes a U2 coil 281, a V2 coil 282 and a W2 coil 283. In FIG. 2 and FIG. 6, the first motor winding set 180 is indicated as a 1st motor winding set and the second motor winding set 280 is indicated as a 2nd motor winding set.

Figure 3:
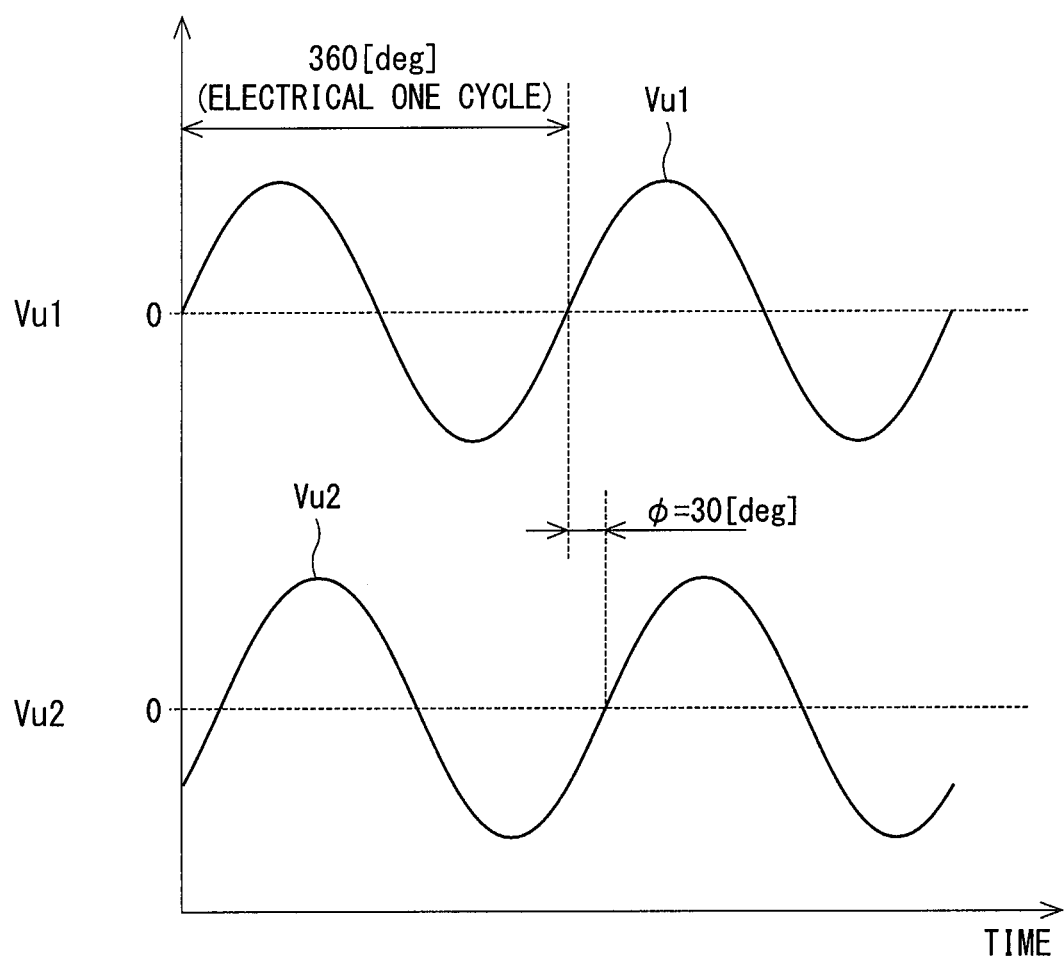
FIG. 3 is a time chart showing a current supply phase difference in the first embodiment.

The first motor winding set 180 and the second motor winding set 280 have the same electrical characteristics as known conventionally. These motor winding sets 180 and 280 are wound on a common stator 840 in a cancel winding form by shifting an electrical angle of 30 [deg] from each other. For this reason, the motor winding sets 180 and 280 are controlled so that phase currents having a phase difference φ of 30 [deg] are supplied as shown in FIG. 3. In FIG. 3, a U-phase voltage Vu1 of the first motor winding set 180 and a U-phase voltage Vu2 of the second motor winding set 280 are exemplarily illustrated. By optimizing the current supply (energization) phase difference, the output torque is improved. Further, by setting the current supply phase difference to the electrical angle of 30 [deg], it is possible to reduce the sixth order torque ripple (see equation (i)).

$$\sin 6(\omega t)+\sin 6(\omega t+30)=0 \quad (i)$$

Since the current is averaged by the current supply with the phase difference, it is possible to maximize cancellation of noise and vibration. In addition, since heat generation is also averaged, it is possible to reduce the temperature-dependent inter-system error such as detection value of each sensor and torque and to average the amount of current that can be supplied. The noise and vibration is abbreviated as NV in the following description.

Hereinafter, a combination of a first inverter circuit 120 and a first control unit 130 and the like, which are related to the driving control for the first motor winding set 180, will be referred to as a first system L1 and a combination of a second inverter circuit 220 and a second control unit 230 and the like, which are related to the driving control of the second motor winding set 280, is referred to as a second system L2. In the present embodiment, the inverter circuits 120 and 220 correspond to driving circuits. The configuration related to the first system L1 is basically indicated with reference numerals having 100 and the configuration related to the second system L2 is basically indicated with reference numerals having 200. In the first system L1 and the second system L2, the same or similar configuration is indicated with same reference numbers in the least significant two digits.

Figure 4:
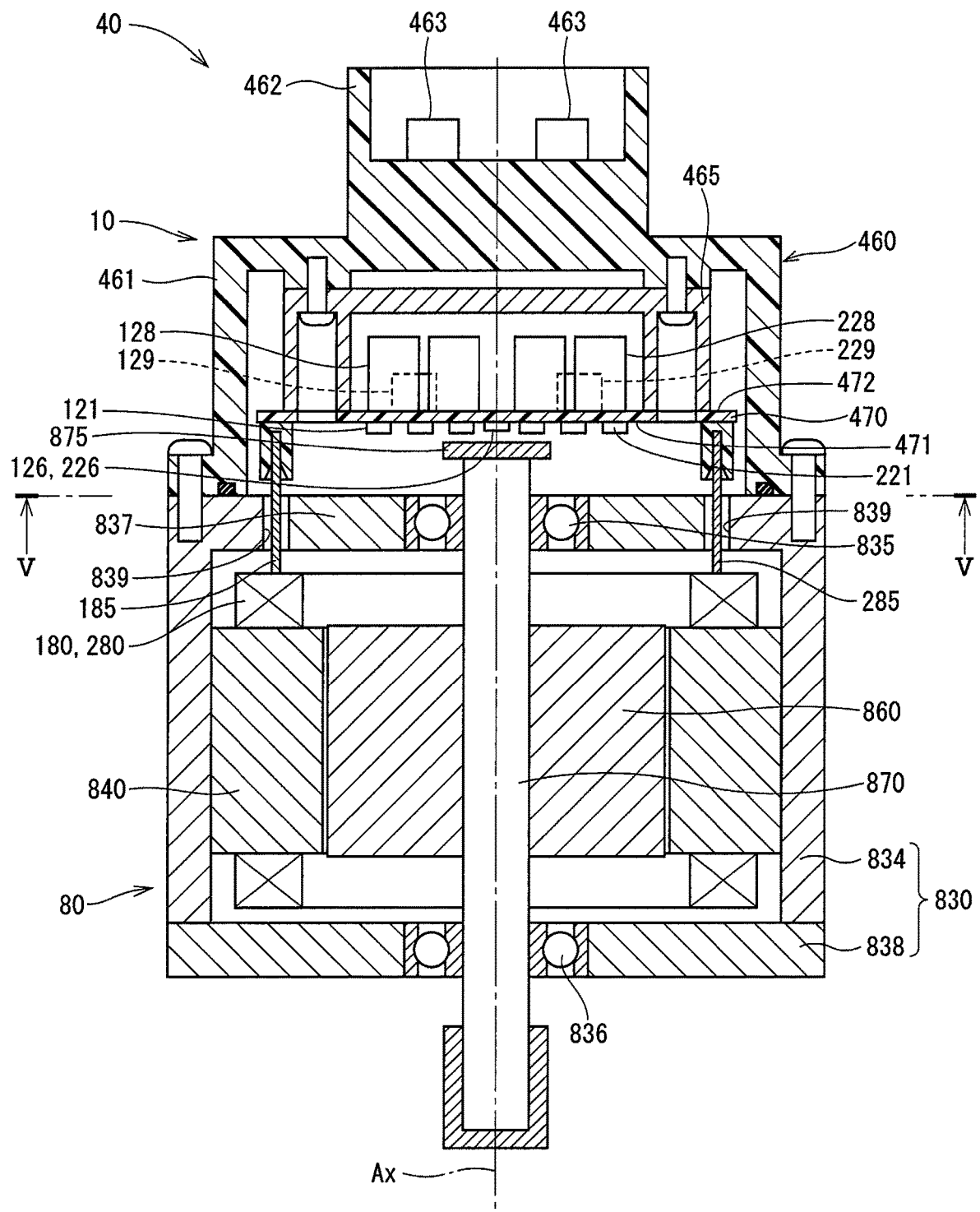
FIG. 4 is a cross-sectional view showing a driving device in the first embodiment.
Figure 5:
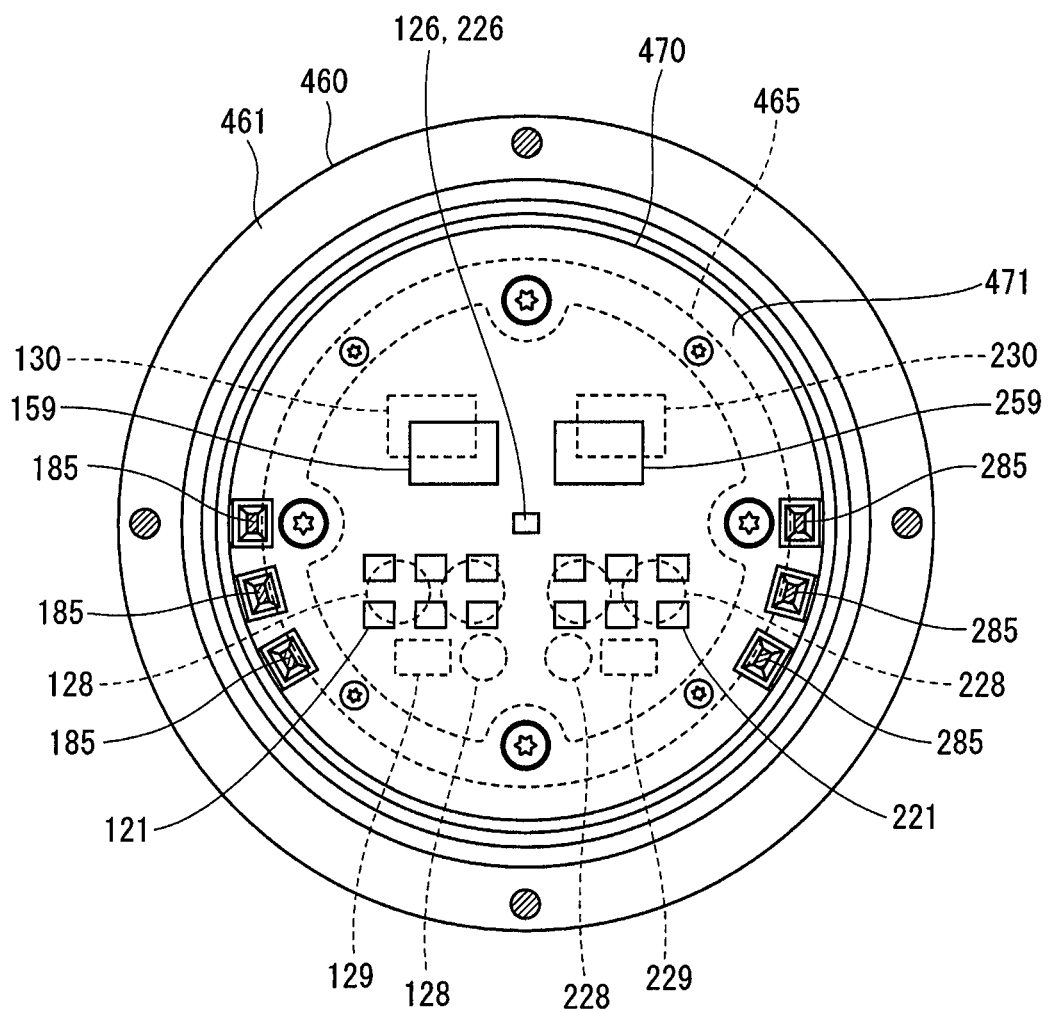
FIG. 5 is a cross-sectional view taken along a line V-V in FIG. 4.

The configuration of the driving device 40 will be described with reference to FIG. 4 and FIG. 5. In the driving device 40 of the present embodiment, the ECU 10 is integrally provided on one side in the axial direction of the motor 80 in a machine-electronics integrated type. The motor 80 and the ECU 10 may alternatively be provided separately without integration. The ECU 10 is positioned coaxially with an axis Ax of a shaft 870 on the side opposite to the output shaft of the motor 80. The ECU 10 may alternatively be provided on the output shaft side of the motor 80. By adopting the machine-electronics integrated type, it is possible to efficiently arrange the ECU 10 and the motor 80 in a vehicle having restricted mounting space.

The motor 80 includes a stator 840, a rotor 860 and a housing 830 which houses the stator 840 and the rotor 860 therein. The stator 840 is fixed to the housing 830 and the motor winding sets 180 and 280 are wound thereon. The rotor 860 is provided radially inside the stator 840 to be rotatable relative to the stator 840.

The shaft 870 is fitted firmly in the rotor 860 to rotate integrally with the rotor 860. The shaft 870 is rotatably supported by the housing 830 by bearings 835 and 836. The axial end portion of the shaft 870 on the ECU 10 side protrudes from the housing 830 to the ECU 10 side. A magnet 875 is provided at the axial end of the shaft 870 on the ECU 10 side.

The housing 830 has a bottomed cylindrical case 834, which has a rear end frame 837, and a front end frame 838 provided on the open side of the case 834. The case 834 and the front end frame 838 and are fastened to each other by bolts or the like. Lead wire insertion holes 839 are formed in the rear end frame 837. Lead wires 185 and 285 connected to each phase of the motor winding sets 180 and 280 are inserted through the lead wire insertion holes 839. The lead wires 185 and 285 are taken out from the lead wire insertion holes 839 to the ECU 10 side and connected to a circuit board 470.

The ECU 10 includes a cover 460, a heat sink 465 fixed to the cover 460, the circuit board 470 fixed to the heat sink 465 and other electronic components mounted on the circuit board 470.

The cover 460 is provided to protect the electronic components from external impacts and to prevent dust and water from entering into the ECU 10. In the cover 460, a cover main body 461 and a connector member 462 are integrally formed. The connector member 462 may alternatively be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at the end portion in the axial direction of the driving device 40 and is open on the side opposite to the motor 80. The connector member 462 includes each connector described later.

The circuit board 470 is, for example, a printed circuit board and is positioned to face the rear end frame 837. On the circuit board 470, the electronic components of the first and second systems are mounted independently for each system so that the two systems are provided in a fully redundant configuration. In the present embodiment, the electronic components are mounted on one circuit substrate 420 but the electronic components may alternatively be mounted on a plurality of circuit substrates.

Of the two principal surfaces of the circuit board 470, one surface on the side of the motor 80 is referred to as a motor-side surface 471 and the other surface opposite from the motor 80 is referred to as a cover-side surface 472. As shown in FIG. 5, switching elements 121 configuring the inverter circuit 120, switching elements 221 configuring the inverter circuit 220, rotation angle sensors 126, 226, custom ICs 159, 259 and the like are mounted on the motor-side surface 471. The rotation angle sensors 126 and 226 are mounted at positions facing the magnet 875 to be able to detect a change in the magnetic field caused by the rotation of the magnet 875.

On the cover-side surface 472, capacitors 128, 228, inductors 129, 229, and microcomputers and the like configuring the control units 130, 230 are mounted. In FIG. 5, reference numerals 130 and 230 are assigned to the microcomputers, which function as main components of the control units 130 and 230, respectively. The capacitors 128 and 228 smoothen input power supplied from batteries 191 and 291 (see FIG. 6). The capacitors 128 and 228 assist electric power supply to the motor 80 by storing electric charge therein. The capacitors 128, 228 and the inductors 129, 229 configure filter circuits, respectively, to reduce noises transmitted from other devices which share the batteries 191, 291, and also to reduce noises transmitted to the other devices, which share the batteries 191, 291, from the driving device 40. Although not shown in FIG. 5, power supply circuits 116, 216, motor relays, current sensors 125, 225 and the like are also mounted on the motor-side surface 471 or the cover-side surface 472.

As shown in FIG. 6, the ECU 10 includes the inverter circuits 120, 220 and the control units 130, 230. The ECU 10 is provided with a first power supply connector 111, a first torque connector 113, a second power supply connector 211 and a second torque connector 213.

The first power supply connector 111 is connected to the first battery 191 and the second power supply connector 211 is connected to the second battery 291. A first alternator 193 is connected to the first battery 191 and a second alternator 293 is connected to the second battery 291. The first power supply connector 111 is connected to the first inverter circuit 120 via a first power supply circuit 116. The second power supply connector 211 is connected to the second inverter circuit 220 via a second power supply circuit 216. The power supply circuits 116 and 216 are, for example, power supply relays.

The torque connectors 113 and 213 are connected to the torque sensor 94. In detail, the first torque connector 113 is connected to a first sensor unit 194 of the torque sensor 94. The second torque connector 213 is connected to a second sensor unit 294 of the torque sensor 94. In FIG. 6, the first sensor unit 194 is shown as the first torque sensor and the second sensor unit is shown as the second torque sensor.

The first control unit 130 acquires a torque signal Ts related to a steering torque Ts from the first sensor unit 194 of the torque sensor 94 via the torque connector 113 and a torque sensor input circuit 118. The second control unit 230 acquires a torque signal Ts related to a steering torque Ts from the second sensor unit 294 of the torque sensor 94 via the torque connector 213 and a torque sensor input circuit 218. The control units 130 and 230 thus calculate the steering torques Ts based on the torque signals.

The first inverter circuit 120 is a three-phase inverter having the switching elements 121 and converts electric power supplied to the first motor winding set 180. The switching elements 121 are controlled to turn on and off based on control signals output from the first control unit 130.

The second inverter circuit 220 is also a three-phase inverter having the switching elements 221 and converts electric power supplied to the second motor winding set 280. The switching elements 221 are controlled to turn on and off based on control signals output from the second control unit 130.

A first current sensor 125 detects a first U-phase current Iu1, a first V-phase current Iv1 and a first W-phase current Iw1, which are supplied to the three phases of the first motor winding set 180, and supplies detected values to the first control unit 130. A second current sensor 225 detects a second U-phase current Iu2, a second V-phase current Iv2 and a second W-phase current Iw2, which are supplied to the three phases of the second motor winding set 280, and supplies detected values to the second control unit 230.

Hereinafter, the U-phase current, the V-phase current and the W-phase current are collectively referred to as a phase current or a winding current. Also, a d-axis current and a q-axis current are collectively referred to as "dq axis current". Voltages are also collectively referred in the similar manner.

A first rotation angle sensor 126 detects a rotation angle of the motor 80 and outputs a detected value to the first control unit 130. A second rotation angle sensor 226 detects a rotation angle of the motor 80 and outputs a detected value to the second control unit 130.

A first temperature sensor 127 is located, for example, in a region where the first inverter circuit 120 is provided, and detects a base temperature H1 related to the first system L1. A second temperature sensor 227 is located, for example, in a region where the second inverter circuit 220 is provided, and detects a temperature B2 related to the first system L1. The base temperature H1 is, for example, a heat sink temperature of the region where the first inverter circuit 120 is provided. The base temperature H2 is, for example, a heat sink temperature of the region where the second inverter circuit 220 is provided.

A first power supply voltage sensor 117 is provided between the first power supply circuit 116 and the first inverter circuit 120 and detects a battery voltage Vb1 supplied from the first battery 191. A second power supply voltage sensor 217 is provided between the second power supply circuit 216 and the second inverter circuit 220 and detects a battery voltage Vb2 supplied from the second battery 291.

Figure 7:
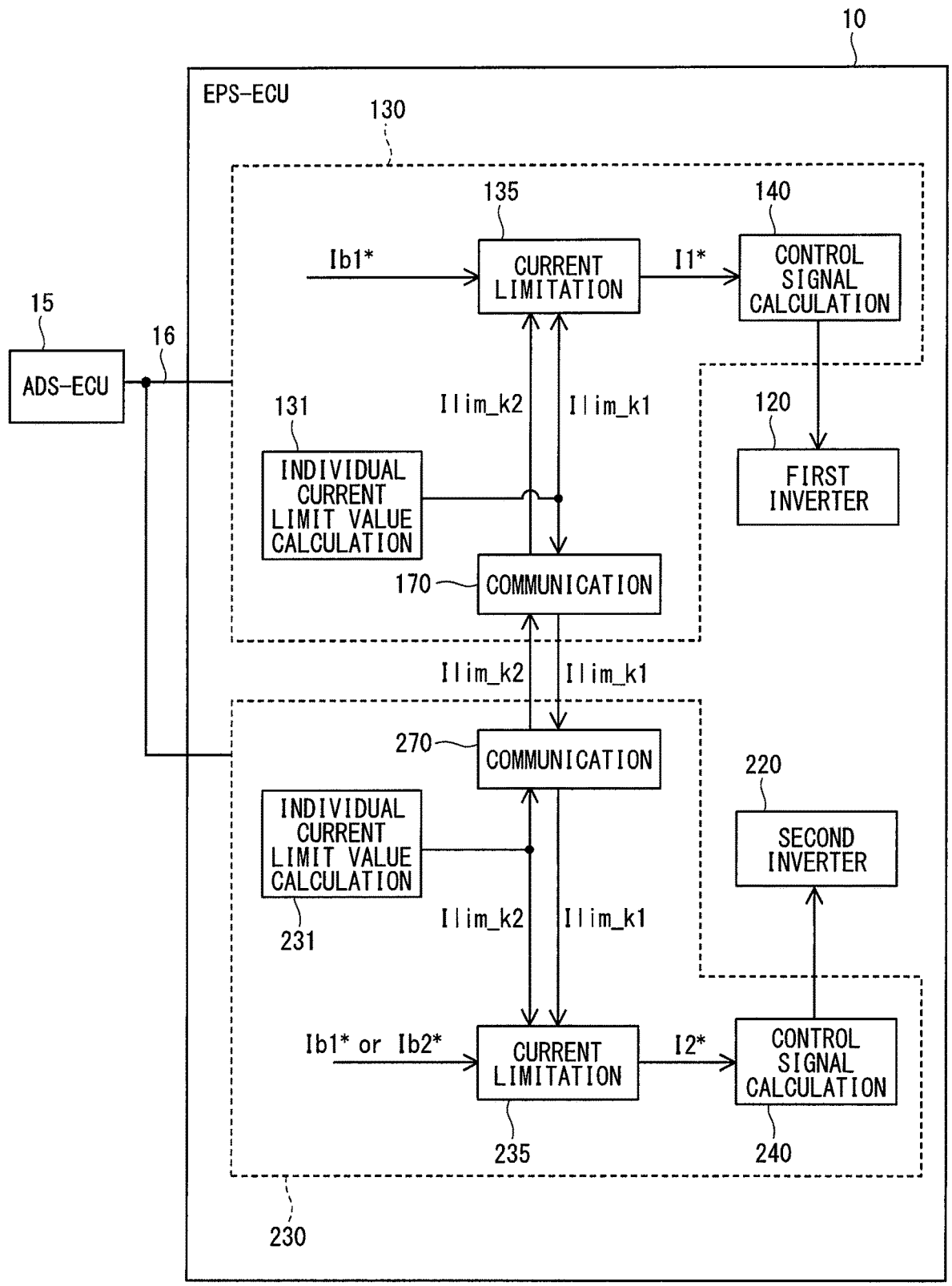
FIG. 7 is a block diagram showing a control unit in the first embodiment.

Power is supplied to the first control unit 130 via the first power supply connector 111 and a regulator (not shown) or the like. Power is supplied to the second control unit 230 via the second power supply connector 211 and a regulator (not shown) or the like. The first control unit 130 and the second control unit 230 have communication units 170 and 270 as shown in FIG. 7, respectively, and are provided to communicate with each other between the control units 130 and 230. Hereinafter, communication between the control units 130 and 230 is referred to as inter-computer communication as appropriate. As a communication method between the control units 130 and 230, any method such as serial communication such as SPI or SENT, CAN (Controller Area Network) communication, FlexRay communication or the like may be used.

As shown in FIG. 7, the control units 130 and 230 of the EPS-ECU 10 are connected to an automatic driving ECU 15 via a vehicle communication network 16 such as CAN. In the figure, the ADS-ECU 15 is indicated as ADS-ECU. The ADS-ECU 15 administers automatic driving control of a vehicle. In FIG. 7, the control units 130 and 230 are both connected to the ADS-ECU 15 at a position outside the EPS-ECU 10. However the control units 130 and 230 may alternatively be connected inside the EPS-ECU 10. Further, one of the control units 130 and 230 may be connected to be able to communicate with the ADS-ECU 15 and the other may exchange information from the control unit, which is connected to the ADS-ECU 15, by inter-computer communication or the like. Further, the control units 130 and 230 are configured to be capable of acquiring various information related to behavior of the vehicle, for example, vehicle speed VS.

Each of the control units 130 and 230 is mainly composed of a microcomputer or the like, and internally includes a CPU, a ROM, a RAM, an I/O (not shown), a bus line for connecting these components, and the like. Each process executed by the control units 130 and 230 may be software processing or may be hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The first control unit 130 includes a first individual current limit value calculation unit 131, a first current limitation unit 135, a first control signal calculation unit 140, a first communication unit 170 and the like. The second control unit 230 includes a second individual current limit value calculation unit 231, a second current limitation unit 235, a second control signal calculation unit 240, a second communication unit 270 and the like. The functions of these units may be performed by execution of computer programs by the CPU. Since the first control unit 130 and the second control unit 230 substantially operate in the same way, the following description will be made primarily in regard to the operation of the first control unit 130 thereby to simplify the description about the second control unit 230. The operation of the second control unit 230 will be understood by replacing the values of the first system with the values of the second system.

The individual current limit value calculation unit 131 calculates a first individual current limit value Ilim_k1. The individual current limit value calculation unit 131 calculates, for example, an overheat protection current limit value, a power supply voltage reference current limit value, a steering operation speed reference current limit value and a current difference reduction current limit value, and sets a minimum one of the calculated values as a first individual current limit value Ilim_k1. The overheat protection current limit value is calculated based on the phase currents Iu1, Iv1, Iw2, the base temperature H1 and the like. The power supply voltage reference current limit value is calculated based on the battery voltage Vb1. The steering operation speed reference current limit value is calculated based on the steering angular velocity ω. The current difference reduction current limit value is calculated based on a winding current I1 of the first system L1 and a winding current I2 of the second system L2. The first individual current limit value Ilim_k1 is transmitted to the second control unit 230 via the communication unit 170. In addition, the second individual current limit value Ilim_k2 calculated by the second individual current limit value calculation unit 231 is transmitted to the first control unit 130 via the communication unit 270.

Each limit value in the individual current limit value calculation unit 131 may be calculated in the same way regardless of the control mode or in different ways by using different maps or arithmetic equations depending on the control mode. For example, in the ADS mode described later, the current difference between the systems is reduced by calculating the limit value to be lower than in the EPS mode.

The current limitation unit 135 calculates the current limit value Ilim1 based on the individual current limit values Ilim_k1 and Ilim_k2, the switching state of the operation mode and the like. The current limitation unit 235 calculates the current limit value Ilim2 based on the individual current limit values Ilim_k1 and Ilim_k2, the switching state of the operation mode and the like.

In the present embodiment, the current limit value is arbitrated between the systems with an unlimited minimum value selection or a limited minimum value selection in accordance with the switching state of the operation mode. In case of the unlimited minimum value selection, the smaller one of the individual current limit values Ilim_k1 and Ilim_k2 is set as the current limit values Ilim1 and Ilim2, and the current limit value is always shared in common between the systems.

In case of the limited minimum value selection, the smaller one of the individual current limit values Ilim_k1 and Ilim_k2 is set as the current limit values Ilim1 and Ilim2 when the individual current limit values Ilim_k1 and Ilim_k2 are both equal to or larger than a common check threshold value Ilim_th, and the current limit value is always shared. On the other hand, when at least one of the individual current limit values Ilim_k1 and Ilim_k2 is smaller than the common check threshold value Ilim_th, the first individual current limit value Ilim_k1 is set as the first current limit value Ilim1 and the second individual current limit value Ilim_k2 is set as the second current limit value Ilim2, and the current limit value is not shared. The common check threshold value Ilim_th is arbitrarily set, for example, to 50% of the rated current.

In case the common check threshold value Ilim_th is set to 0, it is possible to perform the same control in the same way as the unlimited minimum value selection. That is, the common check threshold values Ilim_th differ between the unlimited minimum value selection and the limited minimum value selection. Thus the limited minimum value selection has the common check threshold value Ilim_th, which is larger than that of the unlimited minimum value selection.

In case the basic current command value Ib1* converted from the torque command value is larger than the current limit value Ilim1, the current limitation unit 135 limits the current command value I1.* to the current limit value Ilim1. When the basic current command value Ib1* is equal to or smaller than the current limit value Ilim1, the basic current command value Ib1* is used as it is as the current command value I1*. Similarly, the second control unit 230 calculates a basic current command value Ib2* from the torque command value. The current limitation unit 235 calculates a current command value I2* using either one of the basic current command values Ib1* and Ib2*. The current command values Ib1*, I1*, Ib2*, I2* are values related to a sum of the currents of the motor winding sets 180, 280, and is a value related to the q-axis current in FIG. 8, for example.

The control signal calculation unit 140 generates a control signal based on the current command value I1* by current feedback control and outputs it to the inverter circuit 120. The feedback is abbreviated as FB. The control signal calculation unit 140 switches over control mode between sum-and-difference FB control and independent FB control.

Figure 8:
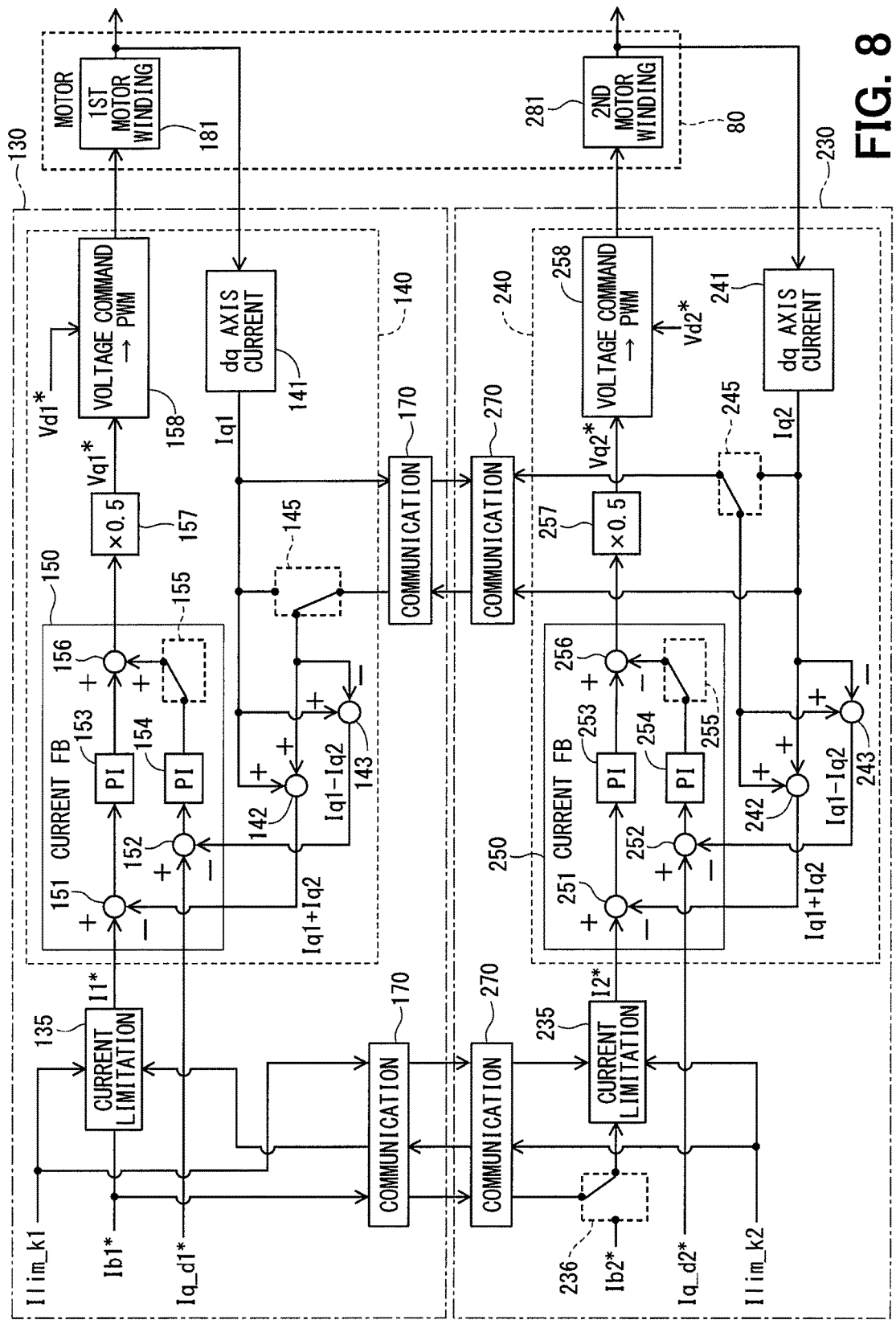
FIG. 8 is a block diagram for explaining current feedback control performed by sum and difference in the first embodiment.
Figure 9:
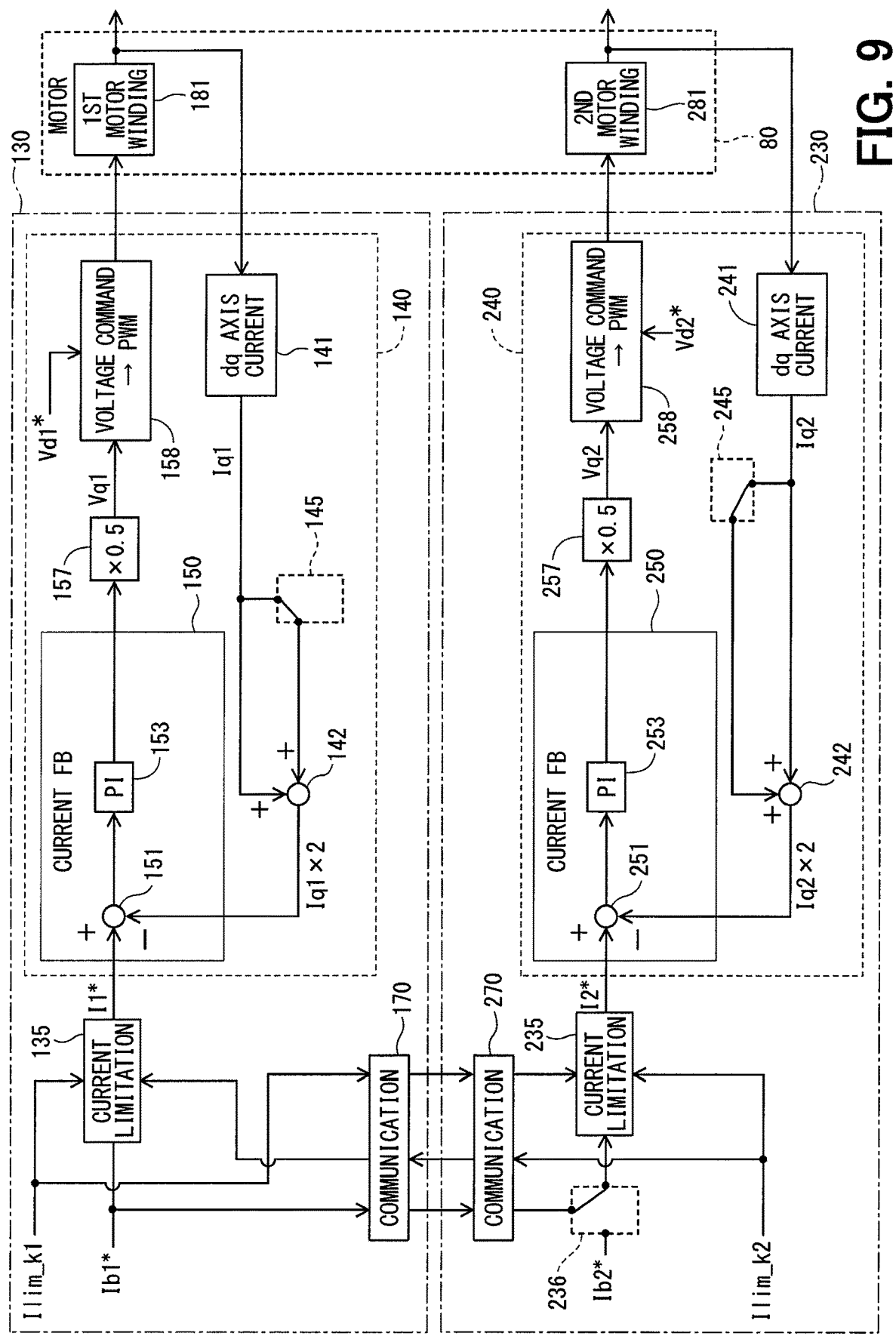
FIG. 9 is a block diagram for explaining independent feedback control in the first embodiment.

The sum-and-difference FB control is shown in FIG. 8, and the independent FB control is shown in FIG. 9. In FIG. 8 and FIG. 9, the calculation related to the q-axis is described primarily. Since the calculation related to the d-axis is similar to the q-axis, description of the calculation related to the d-axis is simplified. In FIG. 8, for convenience, the communication units 170 and 270 are shown as being divided into two. In FIG. 9, the configuration which does not perform calculation operation is not shown. It should be noted that FIG. 8 and FIG. 9 are examples of the sum-and-difference FB control and the independent FB control. The sum-and-difference FB control and the independent FB control may be realized differently. This is also true in FIG. 21.

As shown in FIG. 8, the control signal calculation unit 140 includes a dq axis current calculation unit 141, an adder 142, a subtractor 143, a switching unit 145, a current FB calculation unit 150, a system voltage command value calculation unit 157, a PWM signal generation unit 158 and the like. The control calculation unit 240 includes a dq axis current calculation unit 241, an adder 242, a subtractor 243, a switching unit 245, a current FB calculation unit 250, a system voltage command valve calculation unit 257, a PWM signal generation unit 258 and the like.

The dq axis current calculation unit 141 calculates a first d-axis current detection value Id1 and a first q-axis current detection value Iq1 by dq conversion based on the detection value of the current sensor 125 (not shown in FIG. 8) and the electrical angle. The first dq axis current detection values Id1 and Iq1 are transmitted to the second control unit 230 by the inter-computer communication. The second dq axis current detection values Id2 and Iq2 are transmitted to the first control unit 130 by the inter-computer communication. The switching unit 145 is controlled so that the acquired second q-axis current detection value Iq2 is input to the adder 142 or the subtractor 143.

The adder 142 adds the first q-axis current detection value Iq1 and the second q-axis current detection value Iq2. The subtractor 143 subtracts the second q-axis current detection value Iq2 from the first q-axis current detection value Iq1.

The current FB calculation unit 150 includes subtractors 151, 152, controllers 153, 154, a switching unit 155 and an adder 156. The current FB calculation unit 250 includes substractors 251, 252, controllers 253, 254, a switching unit 255 and an adder 256. The subtractor 151 subtracts a q-axis current sum Iq1+Iq2 from the current command value I1.* to calculate a current sum deviation ΔIq_a1. The subtractor 152 subtracts a q-axis current difference Iq1-Iq2 from the q-axis current command value Iq_d1* to calculate a current difference deviation ΔIq_d1. In the present embodiment, the q-axis current difference command value Iq_d1 is set to 0. However, it may be set to a value other than 0 to have a difference.

The controller 153 calculates a basic voltage command value by proportional-and-integral (PI) calculation or the like so that the current sum deviation ΔIq_a1 is reduced 0. In the sum-and-difference FB control, the switching unit 155 is controlled so that the differential voltage command value is input to the adder 156. The adder 156 adds the basic voltage command value and the difference voltage command value to calculate the two-system voltage command value.

The system voltage command value calculation unit 157 multiplies the two-system voltage command value by 0.5 to calculate a first system voltage command value Vq1*. The PWM signal generation unit 158 calculates the three-phase voltage command values by inverse dq conversion based on the dq axis voltage command values Vd1*, Vq1* and the electrical angle. The PWM signal generation unit 158 generates PWM signals by PWM calculation based on the three-phase voltage command values. The switching elements 121 of the inverter circuit 120 are controlled to turn on and off based on the generated PWM signals.

The second control unit 230 has a switching unit 236 which selects whether to use the first current command value I1.* acquired from the first control unit 130 or the second current command value I2* calculated by itself. In the sum-and-difference FB control, the second control unit 230 controls the switching unit 236 so that the first current command value I1.* acquired from the first control unit 130 is input to the current limitation unit 235.

As shown in FIG. 9, in the independent FB control, the current FB control is performed for each system without controlling the sum and difference. In the present embodiment, the switching unit 145 is controlled so that the first q-axis current detection value Iq1 is input to the adder 142 in place of the second q-axis current detection value Iq2. A value twice as large as the first q-axis current detection value Iq1 is input to a negative side of the subtractor 151. Further, the calculation related to the control of the difference is stopped.

The EPS-ECU 10 is configured to be capable of switching over three control modes, which are a manual steering mode, an automatic driving mode and an override mode. The manual steering mode is for controlling the motor 80 in correspondence to a manual steering operation of a driver. The automatic driving mode is an automatic steering mode for controlling the motor 80 based on a command from an automatic driving ECU 15 without the manual steering operation of the driver. The override mode is a switching mode for switching from the automatic steering mode to the manual steering mode. Hereinafter, the automatic steering mode is referred to as an ADS mode and the manual steering mode is referred to as an EPS mode as appropriate. The override mode may also be regarded as a control mode in which elements of manual control are added to automatic control.

In the automatic steering mode, it is required to be able to guarantee automatic driving safety. In the manual steering mode, it is required to reduce vibration and noise not to give the driver discomfort. Thus required control characteristics are different among the control modes. Therefore, in the present embodiment, by switching current control according to the control mode, optimum characteristics are performed in each control.

Figure 10:
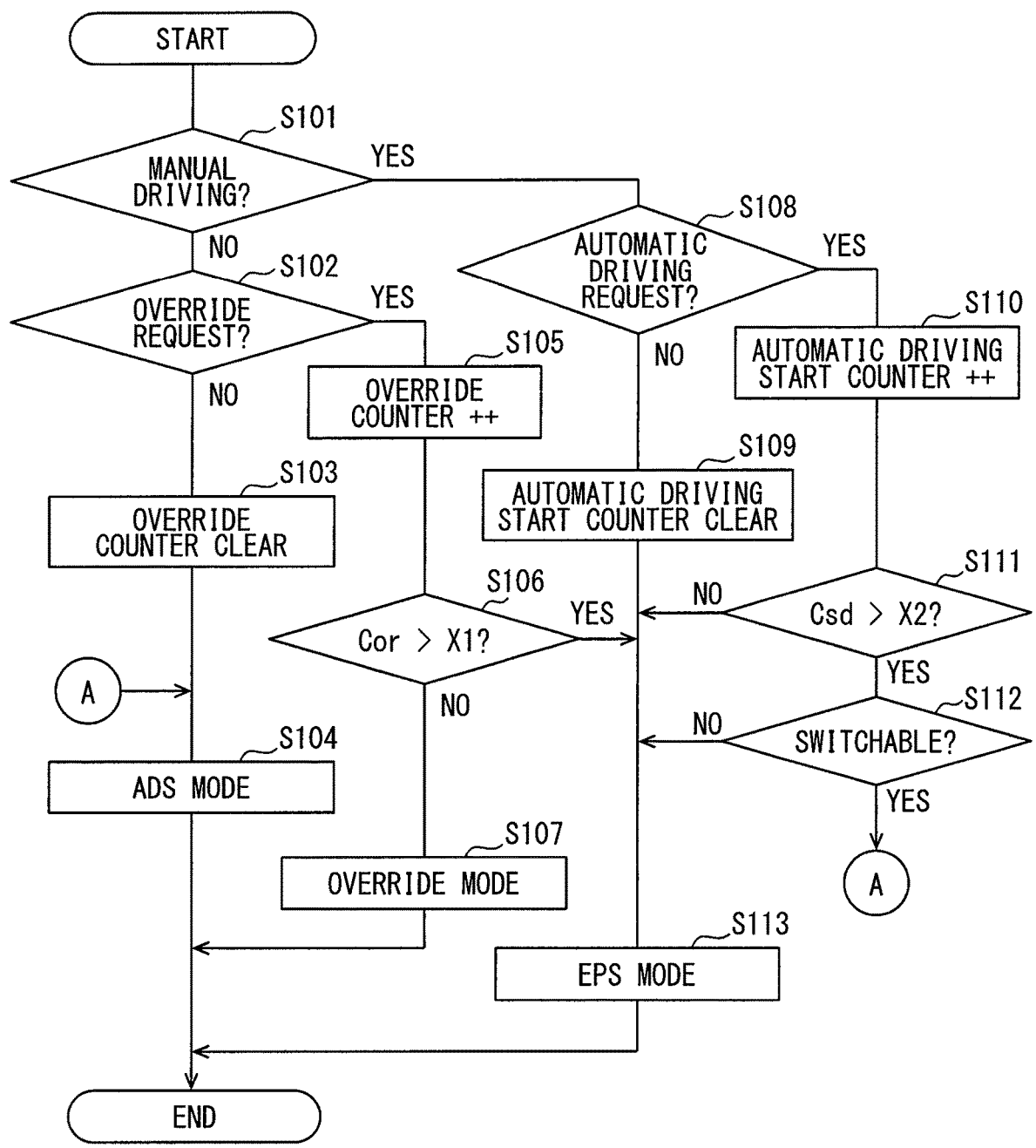
FIG. 10 is a flowchart for explaining control mode switching control processing in the first embodiment.

FIG. 10 is a flowchart showing control mode switching processing. The present processing is executed by the ADS-ECU 15 at a predetermined cycle period. Hereinafter, "step" in each processing is simply referred to as "S."

In S101, the ADS-ECU 15 checks whether manual driving of a vehicle is being performed. When it is determined that the manual driving is being performed (S101: YES), S108 is executed. When it is determined that the manual driving is not being performed (S101: NO), S102 is executed.

In S102, the ADS-ECU 15 checks whether an override request is generated. When it is determined that the override request is generated (S102: YES), S105 is executed. When it is determined that no override request is generated (S102: NO), S103 is executed to clear an override counter. In S104, the ADS-ECU 15 sets the control mode to the ADS mode.

In S105 which is executed when it is determined that the override request is generated (S102: YES), the ADS-ECU 15 increments the override counter. In S106, the ADS-ECU 15 checks whether a count value Cor of the override counter is larger than a check threshold value X1. When it is determined that the count value Cor of the override counter is equal to or smaller than the threshold value X1 (S106: NO), the control mode is set to the override mode in S107. When it is determined that the count value Cor of the override counter is larger than the threshold value X1 (S106: YES), the control mode is set to the EPS mode in S113.

In S108 which is executed when it is determined that manual driving is being performed (S101: YES), the ADS-ECU 15 checks whether the automatic driving request is generated. When it is determined that no automatic driving request is generated (S108: NO), an automatic driving start counter is cleared in S109. Then, the control mode is set to the EPS mode in S113. When it is determined that the override request is generated (S108: YES), the automatic driving start counter is incremented in S110.

In S111, the ADS-ECU 15 checks whether a count value Csd of the automatic driving start counter is larger than a check threshold value X2. When it is determined that the count value Csd of the automatic driving start counter is larger than the threshold value X2 (S111: YES), S112 is executed. When it is determined that the count value Csd of the automatic driving start counter is equal to or smaller than the threshold value X2 (S111: NO), the control mode is set to the EPS mode in S113.

In S112, the ADS-ECU 15 checks whether it is possible to switch the control mode to the automatic driving mode. Here, it is determined that it is possible to switch the control mode to the automatic driving mode when, all predetermined conditions are satisfied. The predetermined conditions may be no steering operation is performed, no abnormality is present, no current limitation is made and the vehicle speed VS is within a range for allowing switching to the automatic driving mode, for example. Such conditions as exemplified above may be less or more. When it is determined that the required conditions for switching to the automatic driving are not satisfied (S112: NO), the control mode is set to the EPS mode in S113. When it is determined that the required conditions for switching to the automatic driving are satisfied (S112: YES), the control mode is set to the ADS mode in S104.

The ADS-ECU 15 notifies the EPS-ECU 10 of the control mode determined in S104, S107 or S113. The EPS-ECU 10 controls driving of the motor 80 based on a received determination result.

Figure 11:
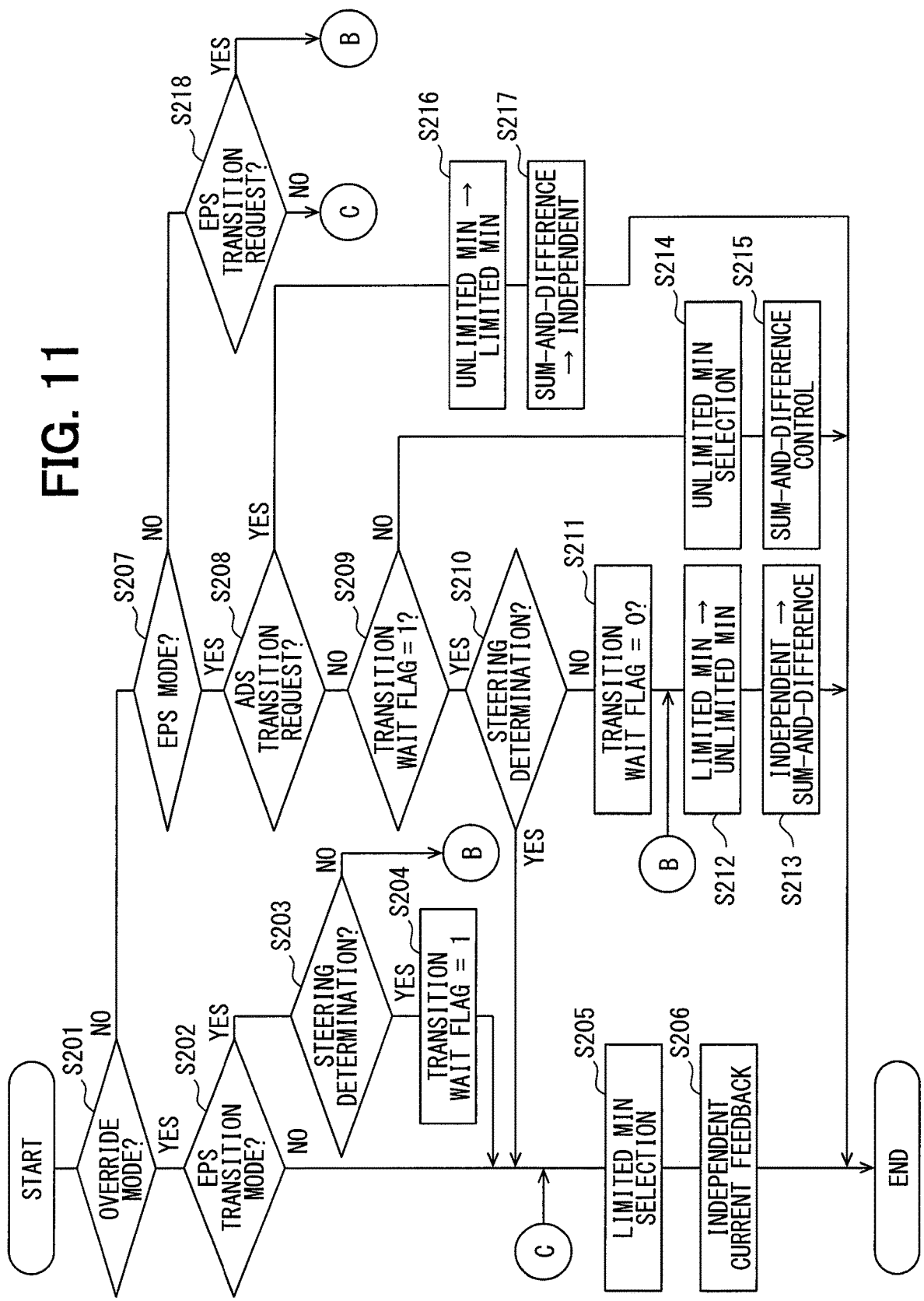
FIG. 11 is a flowchart for explaining angle calculation processing in the first embodiment.

Current control processing according to the switching state of the control mode will be described with reference to a flowchart shown in FIG. 11. Since the control units 130 and 230 perform similar processing, processing in the control unit 130 will be described here. In the present embodiment, since there is no difference in a current limit value arbitration method and a current FB method at time of switching from one of the ADS mode and the override mode to the other, the relevant processing is not shown in the flowchart.

In S201, the control unit 130 checks whether the present control mode is the override mode. When it is determined that the present control mode is not the override mode (S201: NO), step S207 is executed. When it is determined that the present control mode is the override mode (S201: YES), S207 is executed.

In S202, the control unit 130 checks whether there is a transition request from the override mode to the EPS mode. When it is determined that there is no transition request (S202: NO) to the EPS mode, S205 is executed. When it is determined that there is the transition request (S202: YES) to the EPS mode, S203 is executed.

In S203, the control unit 130 checks whether there is a steering determination. Here, when it is determined that the steering operation is being performed, an affirmative determination (YES) is made. When it is determined that the steering determination is not being performed (S203: NO), S212 is executed. When it is determined that there is the steering determination (S203: YES), a transition wait flag is set in S204. In the figure, a state where the transmission wait flag is set is assumed to be "1," and the state where it is not set is assumed to be "0."

S205 is executed when the override mode or the ADS mode is continued, and the current limitation unit 135 continues a limited minimum value selection as a method of arbitrating the current limit value. In S206, the control signal calculation unit 140 continues the independent FB control as the current FB control.

In S207, the control unit 130 checks whether the present control mode is the EPS mode. When it is determined that the present control mode is not the EPS mode (S207: NO), that is, when the present control mode is the ADS mode, S218 is executed. When it is determined that the present control mode is the EPS mode (S207: YES), step S208 is executed.

In S208, the control unit 130 checks whether there is a transition request from the EPS mode to the ADS mode. When it is determined that there is the transition request (S208: YES), S216 is executed. When it is determined that there is no transition request (S208: NO), S209 is executed.

In S209, the control unit 130 checks whether the transition wait flag is being set. When it is determined that transition wait flag is not set (S209: NO), S214 is executed. When it is determined that the transition wait flag is set (S209: YES), S210 is executed.

In S210, the control unit 130 checks whether there is the steering determination in the similar manner as in S203. When it is determined that there is the steering determination (S210: YES), the arbitration method of the current limit value is set to the limited minimum value selection in S205 and the current FB control is set to the independent FB control in S206. When it is determined that there is not the steering determination (S210: NO), the transition wait flag is reset to "0" in S211.

In S212, the current limitation unit 135 changes the arbitration method of the current limit value from the limited minimum value selection to an unlimited minimum value selection. In S213, the control signal calculation unit 140 changes the current FB control from the independent FB control to the sum-and-difference control.

When the EPS mode is continued (S209: NO), S214 is executed. In S214, the current limitation unit 135 continues the unlimited minimum value selection as the method of arbitrating the current limit value. In S215, the control signal calculation unit 140 continues the sum-and-difference control as the current FB control.

In case where it is determined that there is the ADS request (S208: YES), the current limitation unit 135 changes the arbitration method of the current limit value from the unlimited minimum value selection to the limited minimum value selection in S216. In S217, the control signal calculation unit 140 changes the current FB control from the independent FB control to the sum-and-difference control.

In S218 which is executed in case the control mode is the ADS mode (S207: NO), the control unit 130 checks whether there is the transition request from the ADS mode to the EPS mode. When it is determined that there is the transition request (S218: YES), the arbitration method of the current limit value is set to the unlimited minimum value selection in S212 and the current FB control is set to the sum-and-difference control. When it is determined that there is no transition request to the EPS mode (S218: NO), the arbitration method of the current limit value is set to the limited minimum value selection in S205 and the current FB control is set to the independent FB control in S206.

That is, since steering operation feeling need not be taken into consideration and the steering assist force is needed in the ADS mode, the arbitration method of the current limit value is set to the limited minimum value selection and the current FB control is set to the independent FB control. Since the steering operation feeling is important in the EPS mode, the arbitration method of the current limit value is set to the unlimited minimum value selection and the current FB control is set to the sum-and-difference control. In the EPS mode, the limited minimum value selection may be determined to a common check threshold value Ilim_th which is smaller than that of the ADS mode so as to ensure a minimum assist force. During overriding, similarly to the ADS mode, the arbitration method of the current limit value is set to the limited minimum value selection and the current FB control is set to the independent FB control.

FIG. 12 to FIG. 16 are time charts showing current limit values corresponding to control modes. In these figures, the first individual current limit value Ilim_k1, a second individual current limit value Ilim_k2 and the arbitrated first current limit value Ilim1 are indicated by a dotted line, a one-dot chain line and a solid line, respectively. It is to be noted that the second current limit value Ilim2 is not indicated. Also, for the sake of explanation, these lines are shifted slightly one another as appropriate so that the line type can be differentiated.

Figure 12:
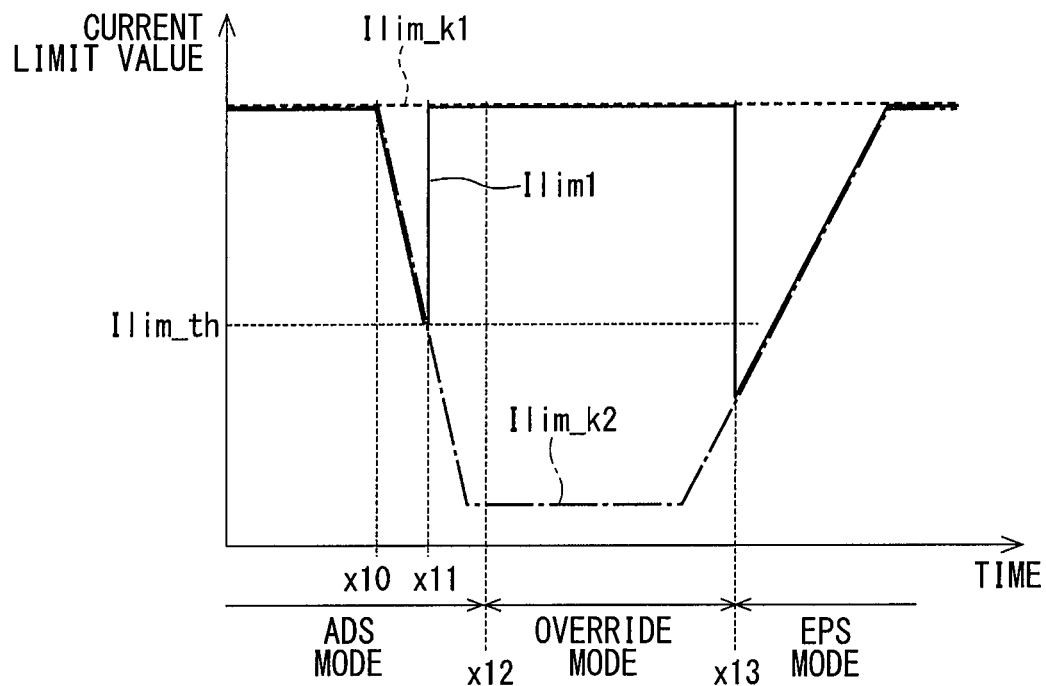
FIG. 12 is a flowchart showing a current limit value in the first embodiment.

FIG. 12 shows the ADS mode up to time x12. It is assumed that, when a steering torque is input manually by the driver at time x12, for example, the mode is switched from the ADS mode to the override mode. It is further assumed that the control mode is switched from the override mode to the EPS mode later at time x13.

When the second individual current limit value Ilim_k2 decreases at time x10, the common current limit value is shared among the systems by setting the first current limit value Ilim1 to the second individual current limit value Ilim_k2 by the minimum value selection. At time x11, the second individual current limit value Ilim_k2 decreases to be smaller than the common check threshold value Ilim_th. At this time, since the control mode is the ADS mode and the method of arbitrating the current limit value is the limited minimum value selection, the first current limit value Ilim1 is set to the first individual current limit value Ilim_k1 so that the current limit value is not shared. Between time x12 and time x13, the control mode is the override mode and the arbitration method of the current limit value is the limited minimum value selection. Also between time x12 and time x13, since the second individual current limit value Ilim_k2 is smaller than the common check threshold value Ilim_th, the first current limit value Ilim1 continues to be the first individual current limit value Ilim_k1.

When the control mode is switched from the override mode to the EPS mode at time x13, the arbitration method of the current limit value is changed from the limited minimum value selection to the unlimited minimum value selection. At time x13, the second individual current limit value Ilim_k2 is smaller than the common check threshold value Ilim_th. For this reason, during the override mode, the first current limit value Ilim1 is set to the first individual current limit value Ilim_k1 by the limited minimum value selection so that the current limit value is not shared. Further, since the unlimited minimum value selection is made after switching to the EPS mode, the first current limit value Ilim1 is changed from the first individual current limit value Ilim_k1 to the second individual current limit value Ilim_k2 so that the common current limit value is shared.

Figure 13:
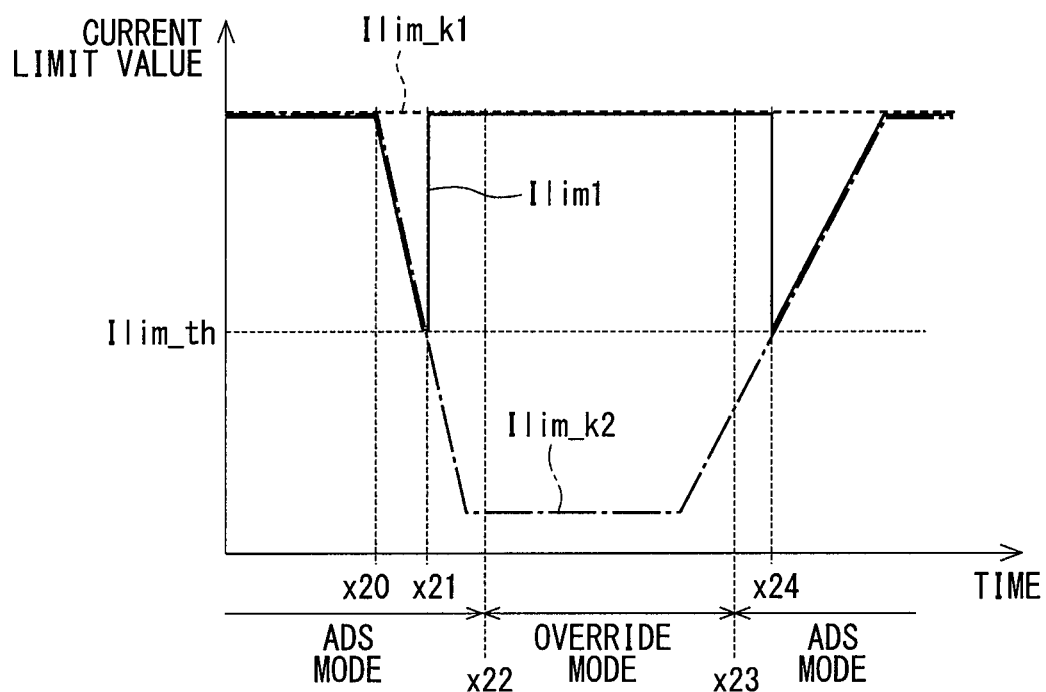
FIG. 13 is a time chart showing the current limit value in the first embodiment.

In FIG. 13, it is assumed that, although the ADS mode continues until time x22 and the control mode changes from the ADS mode to the override mode at time x22, the control mode switching to the EPS mode is not fixed and the control mode returns to the ADS mode at time x23.

The transition of the first current limit value Ilim1 up to time x23 is the same as the transition up to time x13 in FIG. 12. In the example of FIG. 13, since the control mode is switched from the override mode to the ADS mode at time x23, the limited minimum value selection is continued as the arbitration method of the current limit value. Therefore, also after time x23, the first current limit value Ilim1 is set to the first individual current limit value Ilim_k1. On the other hand, when the second individual current limit values Ilim_k2 increases to be larger than the common check threshold value Ilim_th, the first individual current limit value Ilim1 is changed from the first individual current limit value Ilim_k1 to the second individual current limit value Ilim_k2 so that the common current limit value is shared.

Figure 14:
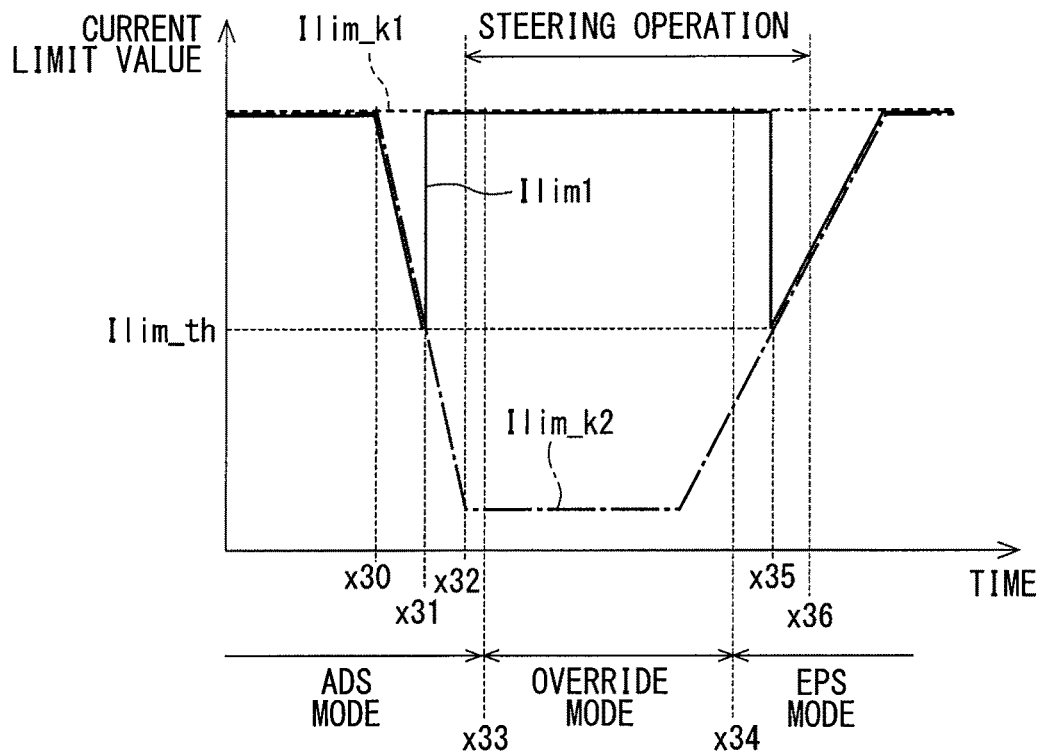
FIG. 14 is a time chart showing the current limit value in the first embodiment.

In FIG. 14, it is assumed that the ADS mode continues until time x33 and the control mode changes from the ADS mode to the override mode at time x33 and the control mode further changes from the override mode to the EPS mode at time x34. Further, it is assumed that steering is being operated from time x32 to time x36.

The transition of the first current limit value Ilim1 up to time x34 at which time the control mode is switched from the override mode to the EPS mode is the same as the transition up to time x13 in FIG. 13. Although the control mode is switched to the EPS mode at time x34, it is still being steered. For this reason, the arbitration method of the current limit value is not switched and the limited minimum value selection is continued. At time x35, since the second individual current limit value Ilim_k2 becomes larger than the common check threshold value Ilim_th, the first current limit value Ilim1 is set to the second individual current limit value Ilim_k2.

Figure 15:
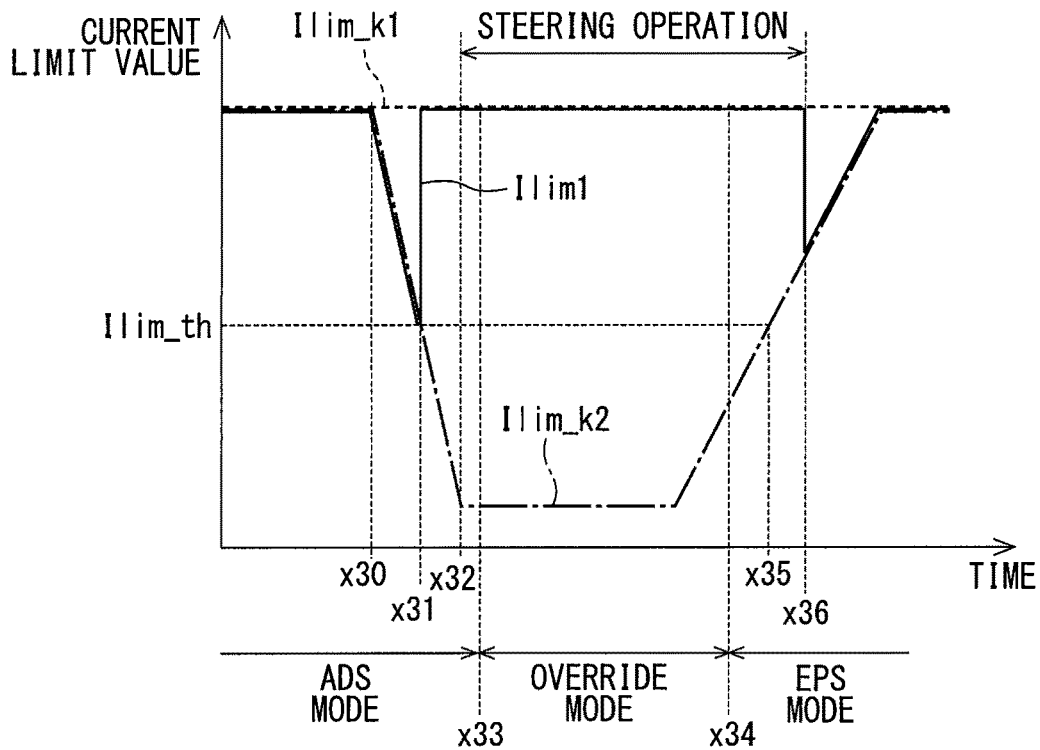
FIG. 15 is a time chart showing the current limit value in the first embodiment.

Further, as shown in FIG. 15, in case the current limit value is not shared during the override at the time of switching the control mode from the override mode to the EPS mode, the non-shared state may be continued during the steering operation. Further, when the steering operation is finished at time x36, the first current limit value Ilim1 may be changed from the first individual current limit value Ilim_k1 to the second individual current limit value Ilim_k2 so that the common current limit value is shared.

Figure 16:
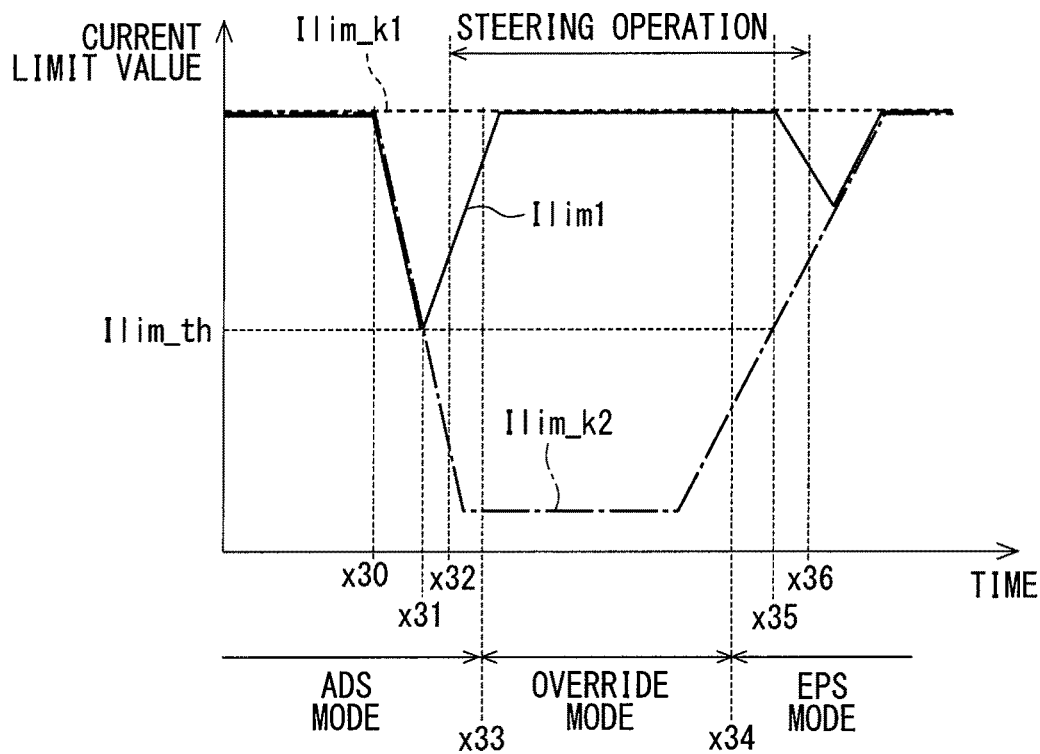
FIG. 16 is a time chart showing the current limit value in the first embodiment.

Furthermore, as shown in FIG. 16, in case that the second individual current limit value Ilim_k2 becomes smaller than the common check threshold value Ilim_th at time x31 and the first current limit value Ilim 1 is changed from the second individual current limit value Ilim_k2 to the first individual current limit value Ilim_k1, the first current limit value Ilim1 may be gradually increased. Similarly, in case that the second individual current limit value Ilim_k2 becomes larger than the common check threshold value Ilim_th at time x35 and the first current limit value Ilim1 is changed from the first individual current limit value Ilim_k1 to the second individual current limit value Ilim_k2, the first current limit value Ilim1 may be gradually decreased. In FIG. 16, when the first current limit value Ilim1 is changed from one of the first individual current limit value Ilim_k1 and the second individual current limit value Ilim_k2 to the other, the limit value is linearly and gradually changed. However, it may be gradually changed nonlinearly, for example, as a quadratic function or an exponential function. Similarly, at the other switching time of the current limit value, the current limit value may be gradually changed. In addition, the rate at which the current limit value is gradually changed may be varied according to at least one of the steering torque Ts, the vehicle speed VS, the steering angular velocity ω, the steering angle and other parameters.

As described above, the EPS-ECU 10, which controls the electric power steering apparatus 8 including the motor 80 having a plurality of motor winding sets 180, 280, includes a plurality of inverter circuits 120, 220 and a plurality of control sections 130, 230. The inverter circuits 120 and 220 are provided for the motor winding sets 180 and 280, respectively. The control units 130 and 230 are provided for the motor winding sets 180 and 280, generate control signals related to driving of the inverter circuits 120 and 220 and control currents flowing through the motor winding sets 180 and 280, respectively thereby controlling the driving of the motor 80.

The control mode includes the manual steering mode for controlling the motor 80 according to the manual steering operation of the steering wheel 91 by the driver and the automatic steering mode for controlling the motor 80 independently of the steering operation of the steering wheel 91 by the driver.

The control units 130 and 230 are capable of switching the control modes and differentiate the current control according to the control mode. The current control includes, for example, the arbitration control of the current limit value between the systems and the current FB control. That is, the current control means the control performed after the calculation of the current command value uniquely converted from the torque command value. In the present embodiment, the current control is performed by calculations in the current limitation units 135, 235 and the control signal calculation units 140, 240. By making the current control different according to the control mode, it is possible to attain optimal characteristics which correspond to each control mode.

The control units 130 and 230 have current limitation units 135 and 235 for setting the current limit values Ilim1 and Ilim2 related to the limitation of the currents flowing through the motor winding sets 180 and 280, respectively. The current limitation units 135 and 235 make the setting of the current limit values Ilim1 and Ilim2 different from each other as the current limitation corresponding to the control mode. By making the current control differently according to the control mode, it is possible to attain optimal characteristics which correspond to each control mode.

A combination of the motor winding set 180, the inverter circuit 120 and the control unit 130 is set as one system. Another combination of the motor winding set 280, the inverter circuit 220 and the control unit 230 is set as another system. The control units 130 and 230 have the individual current limit value calculation units 131 and 231 for calculating individual current limit values Ilim_k1 and Ilim_k2 which are values for each system related to current limitation. In addition, the control units 130 and 230 are capable of acquiring the individual current limit values Ilim_k2 and Ilim_k1 of the other system, respectively.

Each of the control units is capable of switching the control mode between the common current limit value state in which the same value as that of the other system is set as the current limit values Ilim1 and Ilim2 and the independent current limit value state in which the individual current limit value state in which the individual current limit value of the own system is set to the current limit value of the same system. In the present embodiment, in the independent current limit value state, the first individual current limit value Ilim_k1 is set as the first current limit value Ilim1 and the second individual current limit value Ilim_k2 is set as the second current limit value Ilim2. The common check threshold value Ilim_th related to the switching determination between the common current limit value state and the independent current limit value state is different between the manual steering mode and the automatic steering mode.

In the manual steering mode, the current limitation units 135 and 235 limit the common check threshold value Ilim_th to 0 and set the minimum value among the individual current limit values Ilim_k1 and Ilim_k2 as the current limit values Ilim1 and Ilim2 by the unlimited minimum value selection, respectively, thereby setting the common current limit value state. In the automatic steering mode, the current limitation units 135 and 235 set the common check threshold value Ilim_th to the value larger than 0 and switches the control mode between the common current limitation value state and the individual current limitation value state in the following manner. When the individual current limit values Ilim_k1 and Ilim_k2 of all the systems are equal to or larger than the common check threshold value Ilim_th, the minimum value between the individual current limitation values Ilim_k1 and Ilim_k2 is set as the current limit values Ilim1 and Ilim2. When at least a part of the individual current limit values Ilim_k1 and Ilim_k2 of the systems is smaller than the common check threshold value Ilim_th, the current limitation value is set by the limited minimum value selection which sets the current limitation values Ilim1 and Ilim2 system by system. That is, in the manual steering mode, the common check threshold value Ilim_th is set to a smaller value than in the automatic steering mode.

In the automatic steering mode, steering feeling is not of importance but steering assist force is of importance. On the other hand, in the manual steering mode, the steering feeling is important. In case the steering assist force is insufficient, the steering assist force need be supplemented by the driver. Therefore, in the automatic steering mode in the present embodiment, by setting the current limit values Ilim1 and Ilim2 by the limited minimum value selection, priority is given to securing the motor output rather than sharing the common current limit value. In the manual steering mode, by setting the current limit values Ilim1 and Ilim2 by the unlimited minimum value selection, priority is given to sharing of the current limit value for securing steering operation feeling. Thus, an optimum characteristic can be achieved in each control mode.

If the common check threshold value Ilm_th is set to 0, the current limit values Ilim1 and Ilim2 can be shared irrespective of the individual current limit values Ilim_k1 and Ilim_k2. If the common check threshold value Ilim_th is set to an arbitrary value larger than 0, the current limit values Ilim1 and Ilim2 can be switched between common use and non-common use. Further, if the common check threshold value Ilim_th is set to a value as large as possible, such as a current upper limit value, the current limit values Ilim1 and Ilim2 can be made unshared regardless of the individual current limit values Ilim_k1 and Ilim_k2. By changing the common check threshold value Ilim_th in this manner, it is possible to appropriately switch the state of sharing of the current limit values Ilim1 and Ilim2.

The control mode includes, in addition to the automatic steering mode and the manual steering mode, the override mode which is the transition mode from the automatic steering mode to the manual steering mode. In the override mode, the current limitation units 135 and 235 set the common check threshold value Ilim_th to the same value as in the automatic steering mode and set the current limit values Ilim1 and Ilim2 by the limited minimum value selection. As a result, during the override mode, the current limit values Ilim1 and Ilim2 can be set similarly to the automatic steering mode.

When the current limit values Ilim1 and Ilim2 are changed in accordance with the switching from one of the common current limit value state and the independent current limit value state to the other of the states, the current limitation units 135 and 235 may gradually change the current limit values Ilim1 and Ilim2, respectively. As a result, it is possible to prevent a sudden change in the current limit values Ilim1 and Ilim2.

The control units 130 and 230 have the control signal calculation units 140 and 240 that generate the control signals related to driving of the inverter circuits 120 and 220 by the current feedback control, respectively. The control signal calculation units 140 and 240 make the current feedback control different as the current control which corresponds to the control mode. Specifically, the current detection value used for the current feedback control is made different. By making the current control different based on the control mode, it is possible to attain the optimal characteristics which correspond to each control mode.

When the control mode is the automatic steering mode, the control signal calculation units 140 and 240 generate the control signals by the independent feedback control using the current detection value of the own system. When the control mode is the manual steering mode, the control signal calculation units 140 and 240 use the current detection values of the own system and the other system and generate the control signals by the control of the sum-and-difference which controls the sum and difference of the currents flowing in a plurality of motor winding sets 180 and 280. In the present embodiment, the sum-and-difference control is performed as the coordinated feedback control.

In the automatic steering mode, by using the independent feedback control as the current FB control, it is possible to prevent all the outputs from becoming erroneous in common in case where abnormality, detection error or the like occurs in some of the systems. In addition, in the manual steering mode, by using coordinate feedback control, vibration and noise can be reduced and steering feeling can be secured.

When the control mode is the override mode, the control signal calculation units 140 and 240 use the independent feedback control as the current feedback control. As a result, during overriding, the same current FB control as in the automatic steering mode can be performed.

The control units 130 and 230 switch the current control at the time of non-steering by the driver. Specifically, with respect to the current FB control, switching from one to the other between the sum-and-difference control and the independent FB control is prohibited during the steering operation period performed during the non-steering period. Also, regarding the arbitration of the current limit values, the switching from one to the other between the unlimited minimum value selection and the limited minimum value selection is prohibited during the steering operation period and is performed during the non-steering period. Here, assuming that the common check threshold value Ilim_th is prohibited during the steering operation period and performed during the non-steering operation period, the switching from one to the other between the common current limit value state and the independent current limit value state is prohibited during the steering operation period and is performed during the non-steering operation period as described with reference to FIG. 15. As a result, it is possible to prevent discomfort due to switching of the current control during the steering operation.

Second Embodiment

Figure 17:
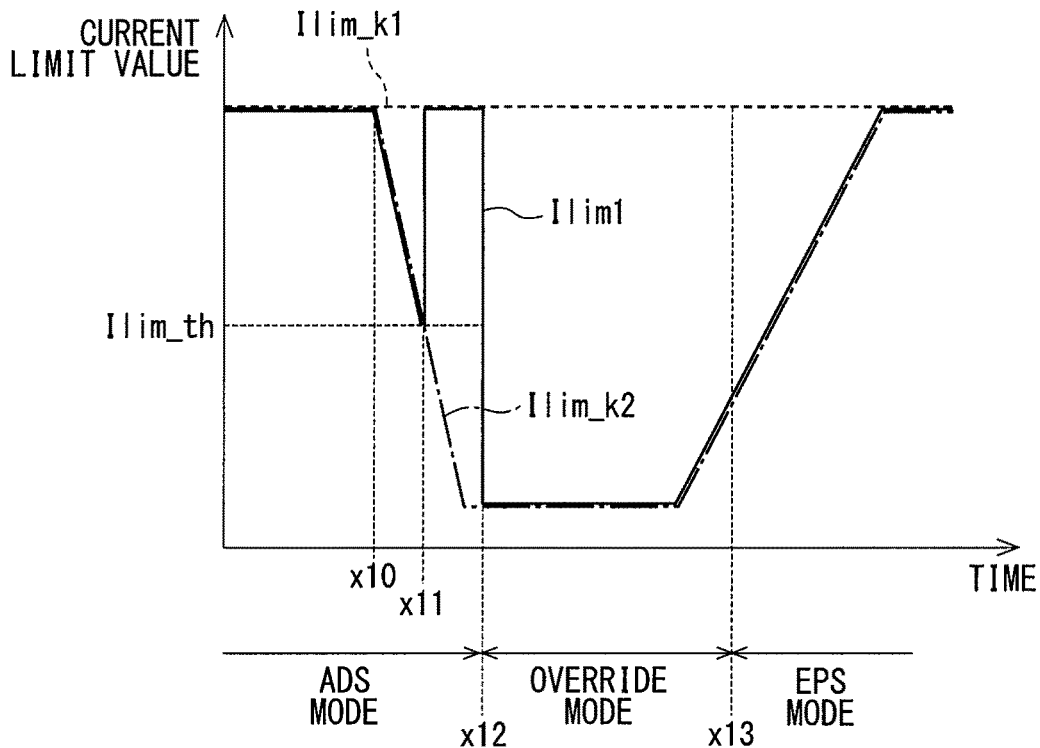
FIG. 17 is a time chart showing a current limit value in a second embodiment.
Figure 18:
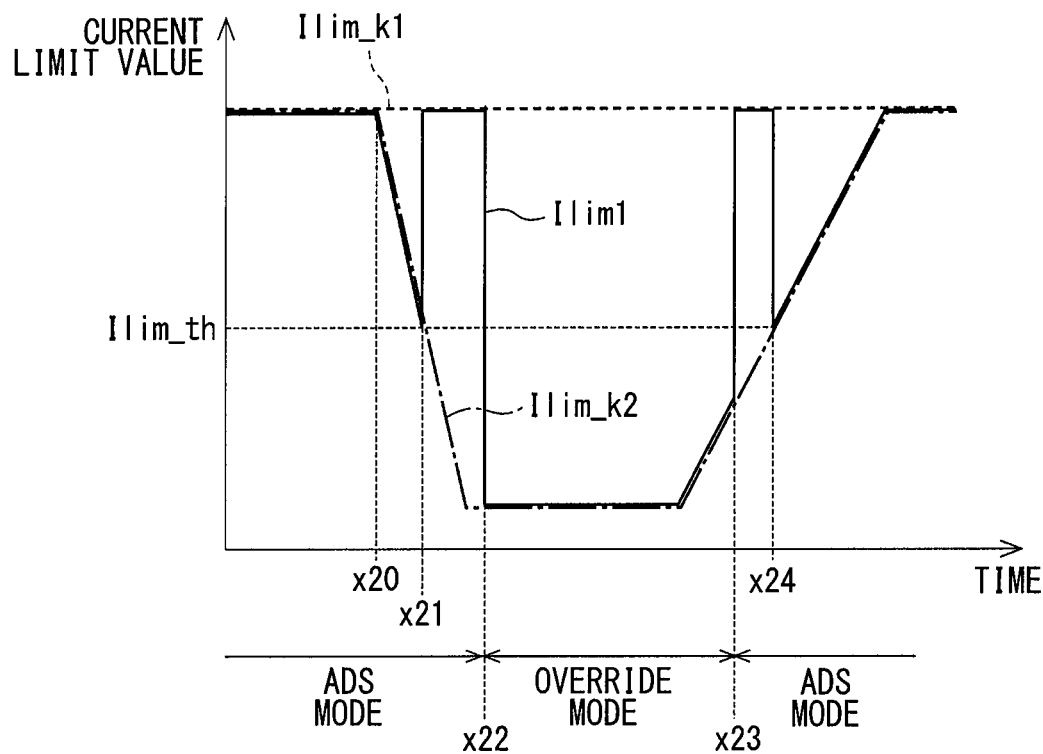
FIG. 18 is a time chart showing the current limit value in the second embodiment.

A second embodiment is shown in FIG. 17 and FIG. 18. In the first embodiment, the current control in the override mode is the same as in the ADS mode. That is, the arbitration method of the current limit value is set to the limited minimum value selection and the current FB control is set to the independent FB control. In the present embodiment, the current control in the override mode is the same as in the EPS mode. That is, in the present embodiment, in the override mode, the arbitration method of the current limit value is set to the unlimited minimum value selection and the current FB control is set to the sum-and-difference control.

FIG. 17 and FIG. 18 are time charts showing current limit values corresponding to control modes. Similarly to FIG. 12, FIG. 17 shows the ADS mode up to time x12, the override mode from time x12 to time x13 and the EPS mode after time x13. The first current limit value Ilim1 up to time x12 is the same as in FIG. 12.

In this embodiment, when the control mode is switched from the ADS mode to the override mode at time x12, the current limitation is switched from the limited minimum value selection to the unlimited minimum value selection. The first current limit value Ilim1 is changed correspondingly from the first individual current limit value Ilim_k1 to the second individual current limit value Ilim_k2. Although the control mode is switched from the override mode to the EPS mode at time x13, the limited minimum value selection is continued as the arbitration method of the current limit value.

In FIG. 18, similarly to FIG. 13, the control mode is the ADS mode until time x22 and the override mode from time x22 to time x23. It is assumed that the control mode switching to the EPS mode is not fixed and the control mode returns to the ADS mode. The operation from time x20 to time x 23 is the same as that of the period from time x10 to time x13 in FIG. 17. When the control mode is switched from the override mode to the ADS mode at time x23, the arbitration method of the current limit value is changed from the unlimited minimum value selection to the limited minimum value selection. At this time, since the second individual current limit value Ilim_k2 is smaller than the common check threshold value Ilim_th, the first current limit value Ilim1 is set to the first individual current limit value Ilim_k1 so that the current limit value is not shared as the common value. Further, when the second individual current limit value Ilim_k2 increases to be larger than the common check threshold value Ilim_th at time x24, the first current limit value Ilim1 is changed from the first individual current limit value Ilim_k1 to the second individual current limit value Ilim_k2 so that the common current limit value is shared by the minimum value selection. This configuration also provides the similar effect as the embodiment described above.

Third Embodiment

Figure 19:
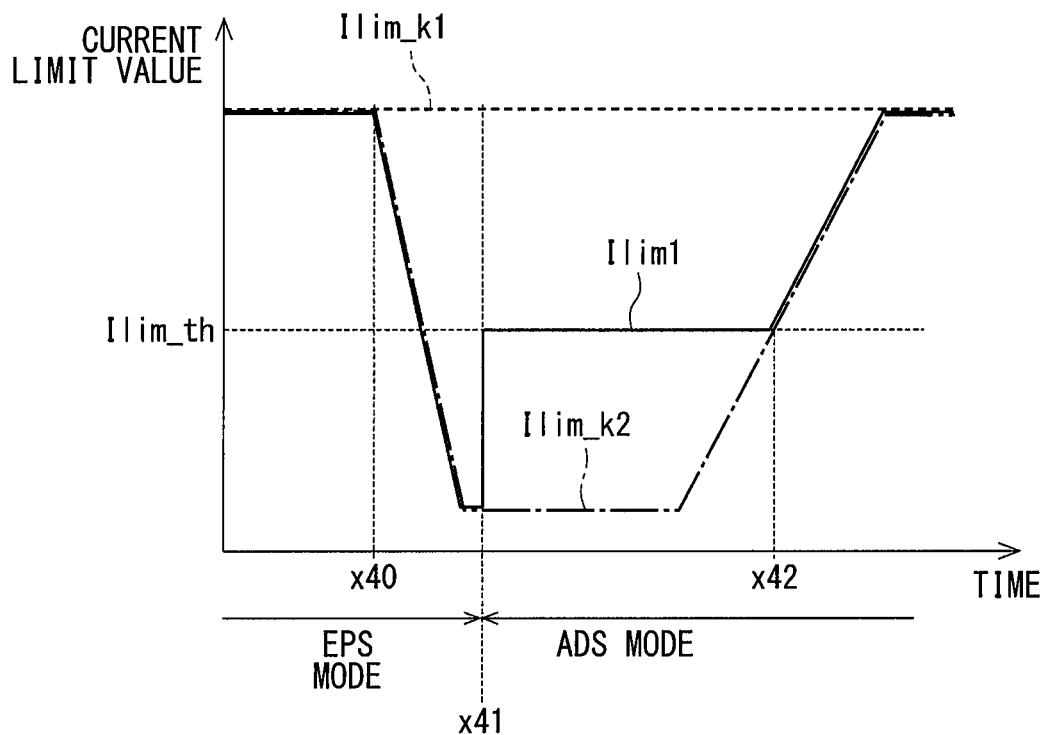
FIG. 19 is a time chart showing a current limit value in a third embodiment.

A third embodiment is shown in FIG. 19. In the present embodiment, switching from the EPS mode to the ADS mode will be described. In FIG. 19, the EPS mode continues up to time x41. It is assumed that the control mode is switched from the EPS mode to the ADS mode at time x41, for example, by the operation of the control mode changeover switch by the driver. In the present embodiment, in the limited minimum value selection in the ADS mode, when the individual current limit value of one system is smaller than the common check threshold value Ilim_th, the current limit value of the other system is set as the common check threshold value Ilim_th. Also in the above embodiment, the current limit value may be independent and not shared by setting the current limit value of the system having the individual current limit value larger than the common check threshold value Ilim_th as the common check threshold Ilim_th by the limited minimum value selection.

Figure 20:
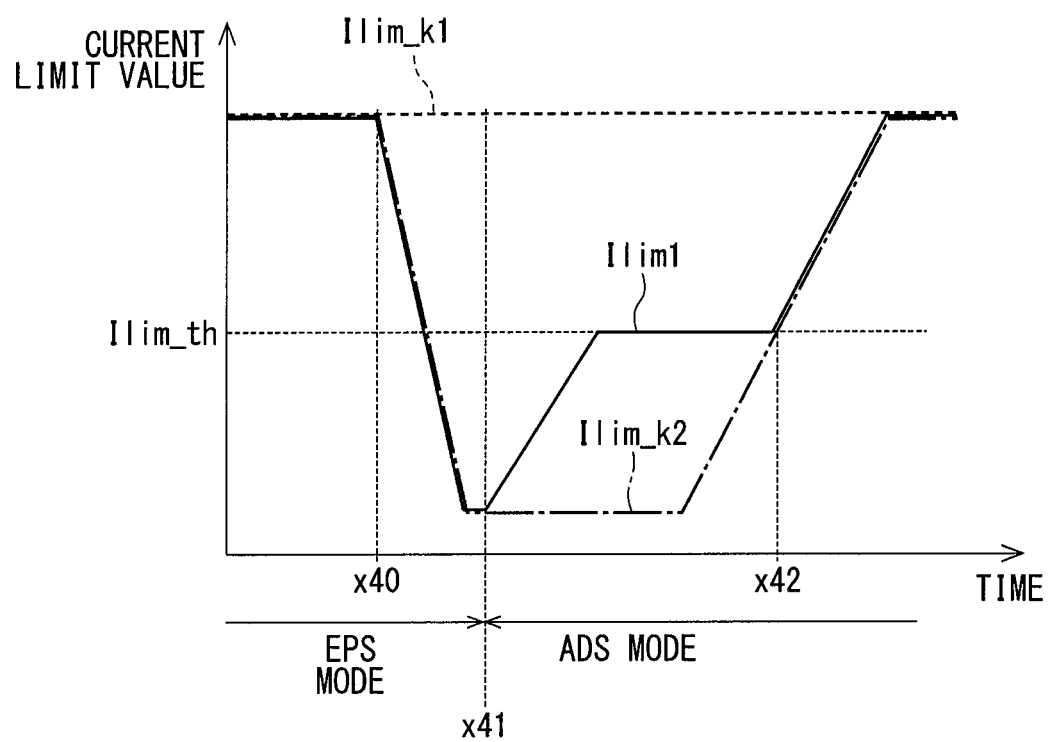
FIG. 20 is a time chart showing the current limit value in the third embodiment.

When the second individual current limit value Ilim_k2 decreases at time x40, the current limit value is shared among systems by setting the first current limit value Ilim1 to the second individual current limit value Ilim_k2 by the minimum value selection. When the control mode is switched from the EPS mode to the ADS mode at time x41, the arbitration method of the current limitation is changed from the unlimited minimum value selection to the limited minimum value selection and the first current limit value Ilim1 is changed from the second individual current limit value Ilim_k2 to the common check threshold value Ilim_th. Further, as shown in FIG. 20, at the time of transition from the EPS mode to the ADS mode, the current limit value may be gradually switched so that the driver does not feel uncomfortableness.

At time x42, when the second individual current limit value Ilim_k2 becomes larger than the common check threshold value Ilim_th, the first current limit value Ilim1 is set to the second individual current limit value Ilim_k2 and the current limit value is shared by the minimum value selection. This configuration also provides the similar effect as the embodiments described above.

Fourth Embodiment

Figure 21:
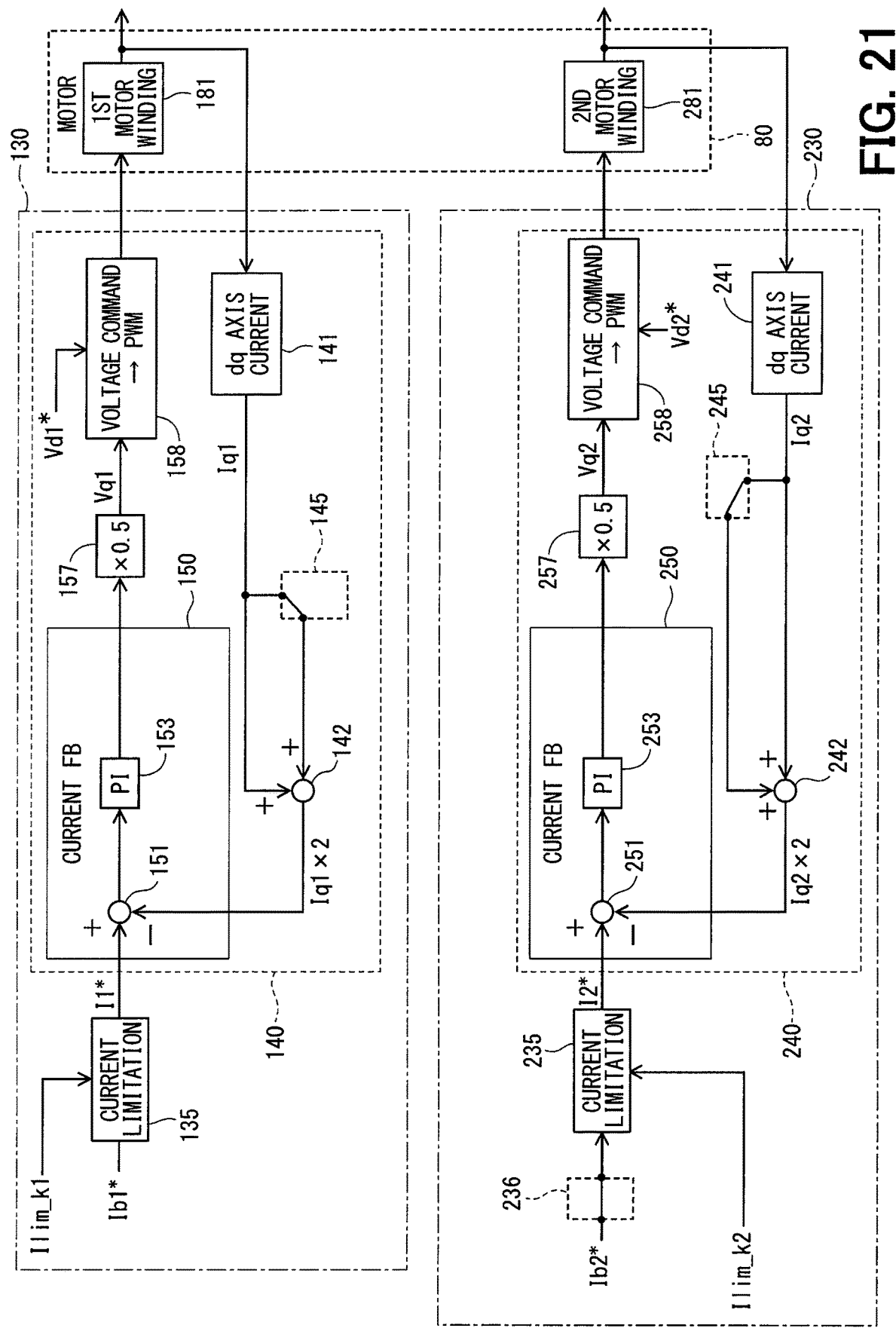
FIG. 21 is a block diagram for explaining fully independent feedback control in a fourth embodiment.

A fourth embodiment is shown in FIG. 21. In the embodiments described above, as the current control in the ADS mode, the arbitration method of the current limit value is set to the limited minimum value selection and the current FB control is set to the independent FB control. That is, in the above embodiments, the current command value is shared with limitation.

In the present embodiment, the current control in the ADS mode is a completely independent FB control that does not share a command value. As shown in FIG. 21, in the completely independent FB control, a switching unit 236 is controlled so that a current command value I2* calculated by the control unit 230 is input to the current limitation unit 235. In the completely independent FB control, the current limitation unit 135 does not arbitrate the current limit value but sets the individual current limit value Ilim_k1 of the own system as the current limit value Ilim1. Similarly, the current limitation unit 235 does not arbitrate the current limit value but sets the individual current limit value Ilim_k2 of the own system as the current limit value Ilim2.

As a result, independence between systems is more ensured and hence it is possible to suppress erroneous outputs in both systems. The present embodiment also provides the same advantages as those of the above embodiments.

Fifth Embodiment

Figure 22:
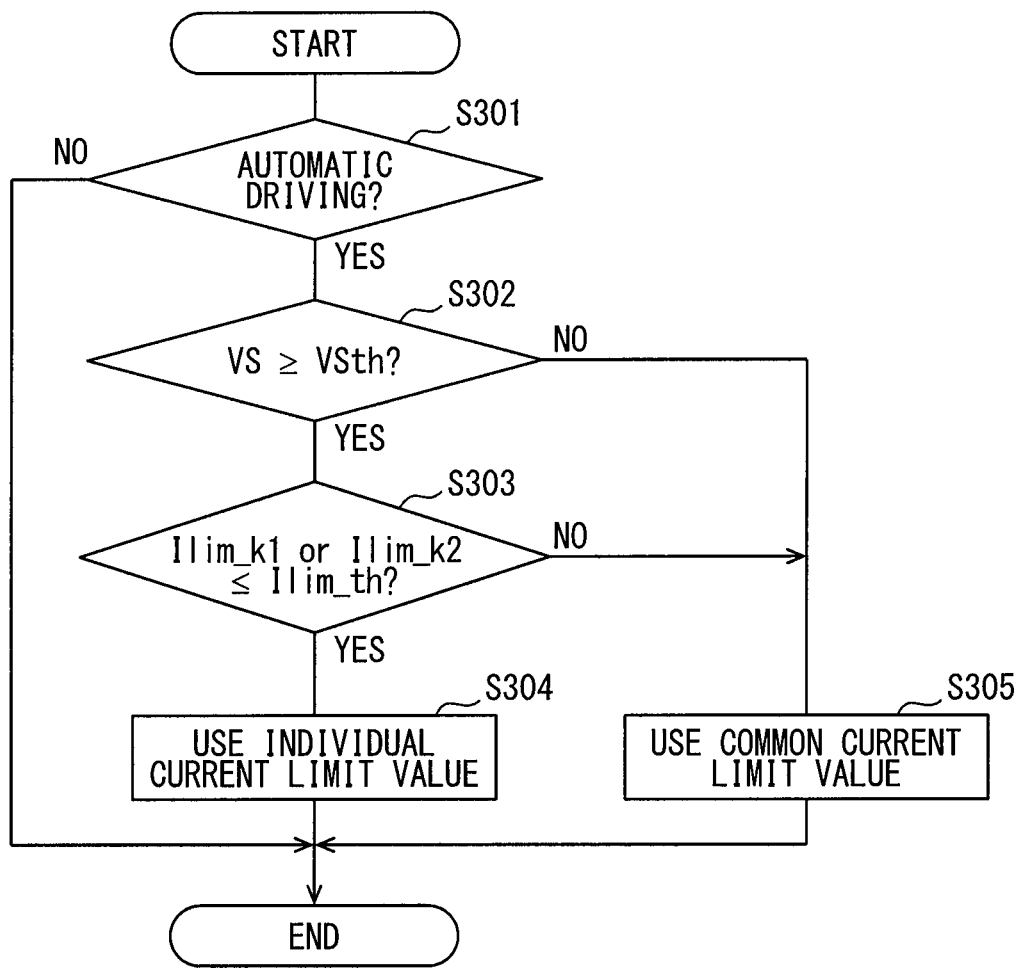
FIG. 22 is a flowchart for explaining current limitation processing in a fifth embodiment.
Figure 23:
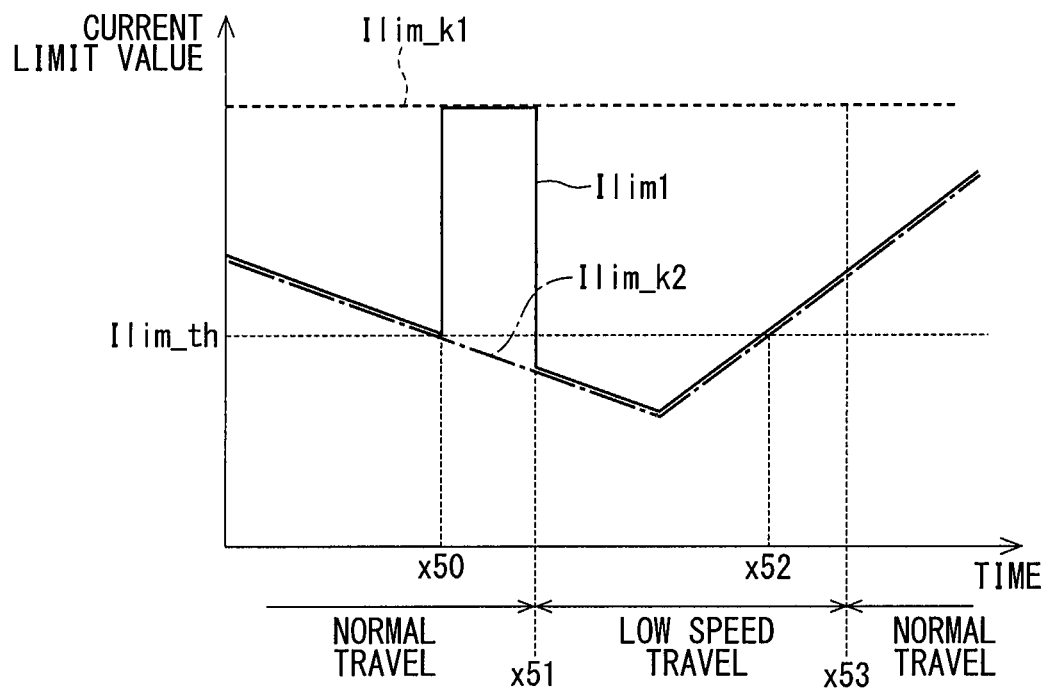
FIG. 23 is a time chart showing a current limit value in the fifth embodiment
Figure 24:
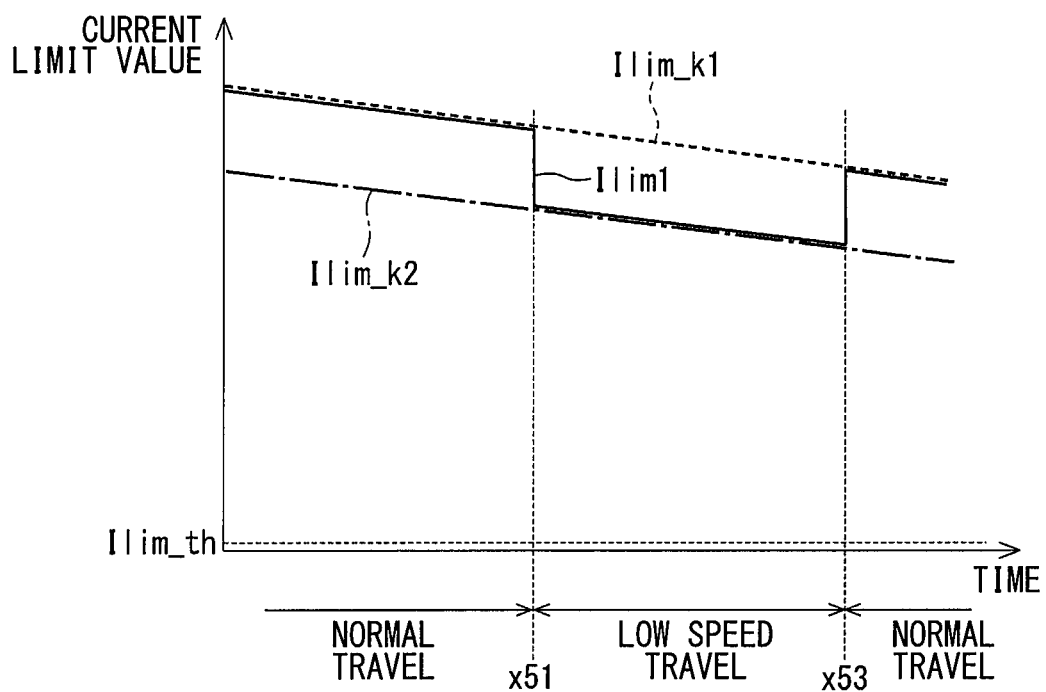
FIG. 24 is a time chart showing the current limit value in the fifth embodiment.

A fifth embodiment is shown in FIG. 22 to FIG. 24. In the present embodiment, the switching between sharing and non-sharing of the common current limit value in the ADS mode is different from the above embodiments and hence this difference will be mainly described.

Current limitation processing of the present embodiment will be described with reference to a flowchart shown in FIG. 22. In S301, the control units 130 and 230 check whether the automatic driving is being performed. When it is determined that the automatic driving is not being performed (S301: NO), the current limitation is made in correspondence to the control mode without executing the following steps (refer to FIG. 11). When it is determined that the automatic driving is being performed (S301: YES), S302 is executed. In case a negative determination is made in S218 in FIG. 11, S302 may be executed in place of this step. This also applies to S401 in FIG. 26.

In S302, the control units 130 and 230 check whether the vehicle speed VS is equal to or higher than a vehicle speed check threshold value VSth. The vehicle speed check threshold value VSth is set to a value (for example, 5 km/h) at which the vehicle can safely be stopped even if the steering assist is insufficient. When it is determined that the vehicle speed VS is lower than the vehicle speed check threshold VSth (S302: NO), S305 is executed. When it is determined that the vehicle speed VS is equal to or higher than the vehicle speed check threshold value VSth (S302: YES), S303 is executed.

In S303, the control units 130 and 230 check whether at least one of the first individual current limit value Ilim_k1 and the second individual current limit value Ilim_k2 is equal to or smaller than the common check threshold value Ilim_th. When it is determined that the first individual current limit value Ilim_k1 and the second individual current limit value Ilim_k2 are larger than the common check threshold value Ilim_th (S303: NO), S305 is executed. When it is determined that at least one of the first individual current limit value Ilim_k1 and the second individual current limit value Ilim_k2 is larger than the common check threshold value Ilim_th (S303: YES), S304 is executed.

In S304, the current limit value is not shared. The first control unit 130 sets the first current limit value Ilim1 to the first individual current limit value Ilim_k1 and the second control unit 230 sets the second current limit value Ilim2 to the second individual current limit value Ilim_k2.

In S305, the current limit value is shared as the common current limit value. The control units 130 and 230 set the current limit values Ilim1 and Ilim2 to the smaller value of the individual current limit values Ilim_k1 and Ilim_k2.

FIG. 23 and FIG. 24 are time charts showing current limit values corresponding to a traveling state of the vehicle during the ADS mode. In the figure, it is assumed that a traveling state where the vehicle speed VS is equal to or higher than the vehicle speed check threshold value VS_th is "normal traveling" and a traveling state where the vehicle speed VS is lower than the vehicle speed check threshold value VS_th is "low speed traveling." The low speed traveling shall include even stoppage of the vehicle. It is assumed that the normal traveling continues till time x 51, the low speed traveling continues from time x51 to time x53 and the normal traveling continues again from time x53. In addition, in the entire period shown in FIG. 23 and FIG. 24, the second individual current limit value Ilim_k2 is smaller than the first individual current limit value Ilim_k1. That is, Ilim_k2<Ilim_k1. This also applies to FIG. 27.

Before time x50, since the traveling state is the normal traveling and the individual current limit values Ilim_k1 and Ilim_k2 are both equal to or larger than the common check threshold value Ilim_th, the current limit values Ilim1 and Ilim2 are set to the second individual current limit value Ilim_k2.

At time x50, the second individual current limit value Ilim_k2 decreases to be smaller than the common check threshold value Ilim_th. At this time, since the vehicle is normally traveling in the ADS mode, the first current limit value Ilim1 is set to the first individual current limit value Ilim_k1. By setting the current limit value to be independent and not shared, priority is given to secure output during traveling in the automatic steering mode and cannot stop the system operation.

When the traveling state changes from the normal traveling to the low speed traveling at time x51, the first current limit value Ilim1 is set to the second individual current limit value Ilim_k2 to share the current limit value in common. In the low speed traveling, since the vehicle can safely be stopped even if the steering assist is insufficient, priority is given to overheat protection and NV reduction, and the current limit value is shared.

At time x52, the second individual current limit value Ilim_k2 becomes equal to or larger than the common check threshold value Ilim_th. When the traveling state changes from the low speed traveling to the normal traveling at time x53, the first current limit value Ilim1 is set to the second individual current limit value Ilim_k2, and a state in which the current limit value is shared is maintained.

Further, as shown in FIG. 24, by setting the common check threshold value Ilim_th to a value as small as possible, the current limit value may be made independent during normal traveling and common during the low speed traveling. S303 in FIG. 22 may be omitted in case that the current limit values Ilim1 and Ilim2 are not shared irrespective of the individual current limit values Ilim_k1 and Ilim_k2 during the normal traveling. At time x50 and time x51 in FIG. 23 as well as at time x51 and time x53 in FIG. 24, the current limit value may be changed gradually at time of switching the current limit value. The same applies to time x61 and time x62 in FIG. 27.

In the present embodiment, when the vehicle speed VS which is the traveling speed of the vehicle is equal to or higher than the vehicle speed check threshold value VSth in the automatic steering mode, the current limitation units 135 and 235 do not share the current limit value or switches the state between the common current limit value state and the independent current limit value state in accordance with the independent current limit values Ilim_k1 and Ilim_k2. When the vehicle speed VS is lower than the vehicle speed check threshold value VSth, the common current limit value state is set. As a result, during traveling, torque shortage can be prevented by giving priority to output.

Sixth Embodiment

Figure 25:
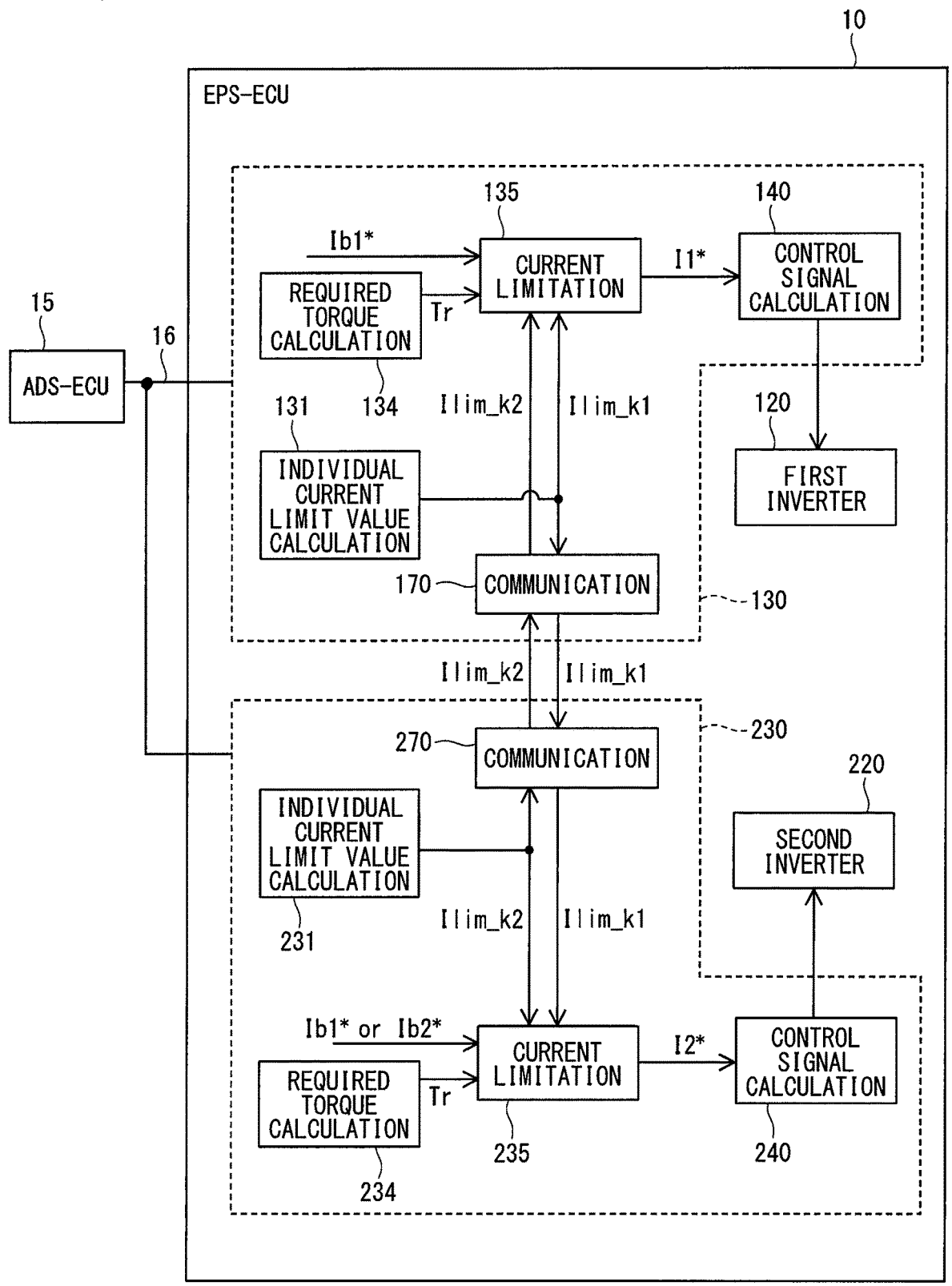
FIG. 25 is a block diagram showing a control unit in a sixth embodiment.
Figure 26:
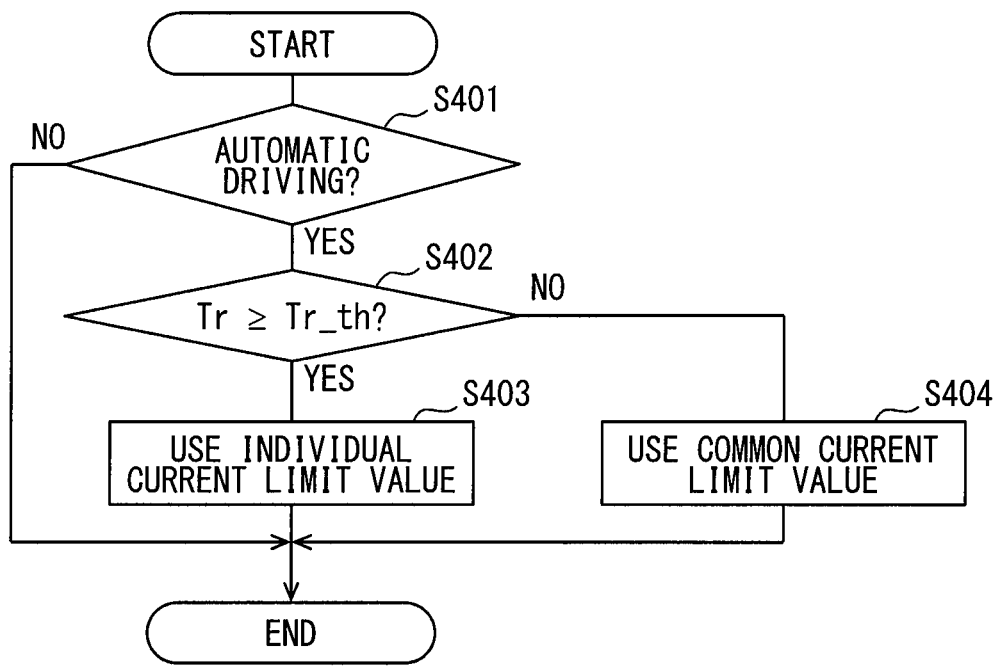
FIG. 26 is a flowchart for explaining current limitation processing in the sixth embodiment.
Figure 27:
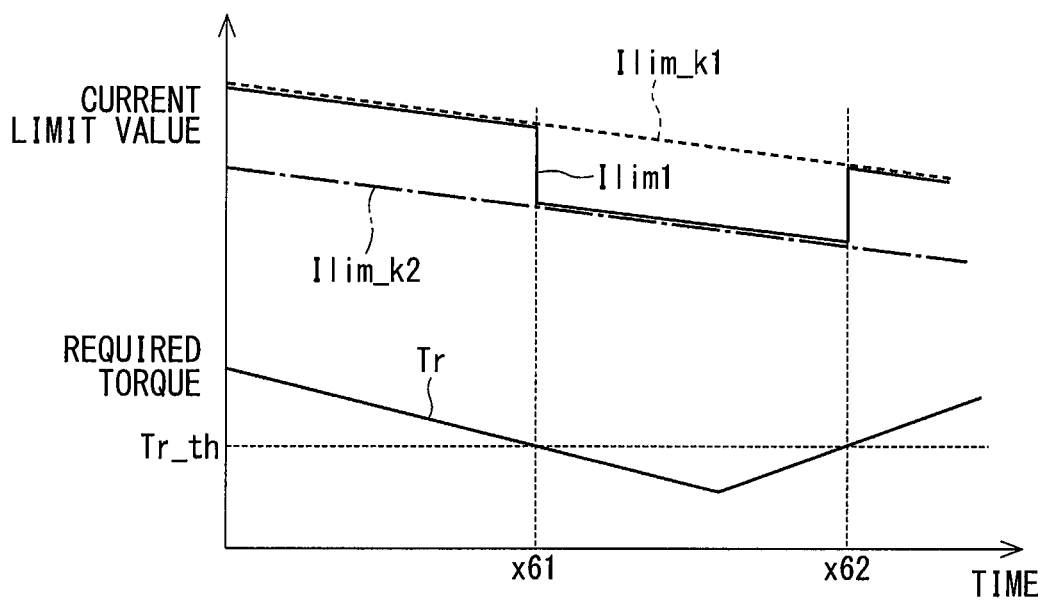
FIG. 27 is a time chart showing a current limit value in the sixth embodiment.

A sixth embodiment is shown in FIG. 25 to FIG. 27. As shown in FIG. 25, the control units 130 and 230 of the present embodiment include required torque calculation units 134 and 234, respectively. The required torque calculation units 134 and 234 calculate estimated required steering torques Tr, respectively, which are required for the steering operation based on a road surface condition and the traveling state. The estimated required steering torque Tr is calculated based on parameters such as a present position of the vehicle, that is, curved or straight, a friction coefficient of a road surface and the vehicle speed. Parameters and calculation methods used in this calculation are not limited.

Current limitation processing of the present embodiment will be described with reference to a flowchart of FIG. 26. In S401, similarly to S301 of FIG. 22, the control units 130 and 230 check whether the automatic driving is being performed. When it is determined that the automatic driving is not being performed (S401: NO), the current limitation is made in correspondence to the control mode without executing the following steps (refer to FIG. 11). When it is determined that the automatic driving is being performed (S301: YES), S402 is executed.

In S402, the control units 130 and 230 check whether the estimated required steering torque Tr is equal to or larger than a torque check threshold value Tr_th. The torque check threshold value Tr_th is set to an arbitrary value which indicates necessity to prioritize securing the output over overheat protection and NV reduction. When it is determined that the estimated required steering torque Tr is equal to or larger than the torque check threshold value Tr_th (S402: YES), S403 is executed and the current limit value is made independent. When it is determined that the estimated required steering torque Tr is smaller than the torque check threshold value Tr_th (S 402: NO), S404 is executed and the current limit value is made common. Details of S403 and S404 are similar to S304 and S305 in FIG. 22.

FIG. 27 is a time chart showing the current limit value corresponding to the estimated required steering torque Tr in the ADS mode. Before time x61, since the estimated required steering torque Tr is equal to or larger than the torque check threshold value Tr_th, the first current limit value Ilim1 is set to the first individual current limit value Ilim_k1. By setting the current limit value to be independent and not shared, priority is given to secure output in a state that a relatively large steering torque is required.

When the estimated required steering torque Tr becomes smaller than the torque check threshold value Tr_th at time x61, the first current limit value Ilim1 is set to the second individual current limit value Ilim_k2 so that overheat protection and NV reduction are prioritized and the current limit value is shared. When the estimated required steering torque Tr becomes equal to or larger than the torque check threshold value Tr_th at time x62, the first current limit value Ilim1 is set to the first individual current limit value Ilim_k1 so that output securing is prioritized.

The control units 130 and 230 include required torque estimation units 134 and 234, respectively, to calculate the estimated required steering torques Tr which are required for steering. In the automatic steering mode, when the estimated required steering torque Tr is equal to or larger than the torque check threshold value Tr_th, the independent current limit value state is set. When the estimated required steering torque Tr is smaller than the torque check threshold value Tr_th, the common current limit value state is set. Thus, depending on the estimated required steering torque Tr, it is possible to switch appropriately whether to share or not share the current limit values Ilim1 and Ilim2 based on the estimated required steering torque Tr.

Other Embodiment

In the above embodiments, the individual current limit value calculation unit is configured to calculate the overheat protection current limit value, the power supply voltage reference current limit value, the steering operation speed reference current limit value and the inter-system difference current limit value, and selects the minimum value as the individual current limit value by the minimum value selection. As the other embodiment, the overheat protection current limit value as the temperature reference, the power supply reference current limit value or the steering operation speed reference current limit value may be omitted. In the above embodiments, the temperature, the battery voltage and the steering angular velocity are used as the parameters related to each system, and the individual current limit value is calculated based on these parameters. As the other embodiment, the battery voltage or the steering angular velocity may be omitted as the parameters related to each system, or the individual current limit value may be calculated based further on other parameters.

In addition, the current limitation unit may be configured to separate the overheat protection current limit value, the power supply voltage reference current limit value, the steering operation speed reference current limit value and the inter-system difference current limit value into groups, one of which shares the common value and the other of which does not share the common value. For example, the steering operation speed reference current limit value which is likely to be limited at high speed steering and which has a large influence on NV improvement is shared, but the overheat protection current limit value is not shared. With respect to the steering operation speed reference current limit value in the override mode, the current limit value may be independent and not common or a largest current limit value may be used as the common value by a maximum value selection.

In the above embodiments, the current limitation unit shares the current limit value in common by the minimum value selection. As the other embodiment, the current limit value may be shared by other than the minimum value selection, such as maximum value selection for selecting the largest value, geometric mean value, arithmetic mean value or the like. Further, as the other embodiment, in the EPS mode, a logic of current limitation may be appropriately added according to the control mode, for example, by limitation based on the detection current of the other system.

In the above embodiments, the current limit value is shared in common by the unlimited minimum value selection in the EPS mode. As the other embodiment, the current limit value in the EPS mode may be shared in common by the limited minimum value selection. In this case, the common check threshold value may be arbitrarily set, but it is desirable that it is smaller than the common check threshold value used in the ADS mode.

The common check threshold value may be fixed to a constant value or may be varied according to, for example, the steering operation speed, the battery voltage, the temperature and the like. For example, in case of high rotation speed or low voltage, it is possible to prioritize output securing over NV reduction by increasing the common check threshold value. As the other embodiment, for example, each embodiment may be combined appropriately. For example, the current limit value may be made independent when the vehicle speed is equal to or higher than the vehicle speed check threshold value and the estimated required steering torque is equal to or larger than the torque check threshold value, the current limit value may be switched to be common or independent based on the individual current limit value or the current limit value may be shared when the vehicle speed is lower than the vehicle speed check threshold value or when the estimated required steering torque is equal to or larger than the torque check threshold value. In addition, the calculation of the estimated required steering torque by the required torque calculation unit may be performed by acquiring the required steering torque by the required torque calculation unit from a required steering torque calculation unit which is provided externally.

In the above embodiment, two control units are provided. As the other embodiment, the number of the control units may be one, three or more. The number of winding sets and the number of driving circuits may also be one, three or more. That is, the number of systems may be one, three or more. A plurality of driving circuits and winding sets may be provided for one control unit.

In the above embodiments, the rotary electric machine is a three-phase brushless motor. As the other embodiment, the rotary electric machine is not limited to the brushless motor but may be any other motors. In the above embodiments, the driving device is the machine-electronics integrated type in which the ECU and the motor are provided integrally. As the embodiment, the ECU may be provided separately from the motor.

The present disclosure is not limited to the embodiments described above, and various modifications may be implemented without departing from the spirit of the present disclosure.

What is claimed is:

1. A steering control apparatus for controlling an electric power steering apparatus, which is provided with a rotary electric machine, the steering control apparatus comprising:
   a driving circuit provided to drive the rotary electric machine; and
   a control unit connected to the driving circuit and configured to control driving of the rotary electric machine by generating a control signal related to driving of the driving circuit and controlling a current flowing in the rotary electric machine, wherein:
   the control unit is configured to switch a control mode, which includes a manual steering mode and an automatic steering mode, and differentiate current control in correspondence to the control mode, the manual steering mode configured to control the rotary electric machine in correspondence to a manual steering operation on a steering member of a vehicle, and the automatic steering mode configured to control the rotary electric machine independently of the manual steering on the steering member;
   the control unit includes a current limitation unit configured to set a current limit value for limiting the current flowing in the rotary electric machine;
   the current limitation unit is configured to differentiate the current limit value as current control corresponding to the control mode;
   the rotary electric machine has a plurality of winding sets;
   the driving circuit and the control unit are provided in correspondence to each winding set thereby to form one system;
   the control unit includes an individual current limit value calculation unit configured to calculate an individual current limit value that limits current of the one system, acquire the individual current limit value of a second system and switch a common current limit value state for a same current limit value as that of the second system and an independent current limit value state for setting an independent current limit value independently of that of the second system; and
   the control unit differentiates a common check threshold value, which is provided to switch the common current limit value state and the independent current limit value state, between the manual steering mode and the automatic steering mode.

2. The steering control apparatus according to claim 1, wherein:
the current limitation unit is configured to set the common current limit value state in the manual steering mode by setting the common check threshold value to 0 and setting the current limit value by an unlimited minimum value selection which selects a smallest value among individual current limit values as the current limit value; and
the current limitation unit is further configured to switch the common current limit value state and the independent current limit value state in the automatic steering mode by setting the common check threshold value to be larger than 0, setting the current limit value to the smallest value among the individual current limit values when the individual current limit values of all the systems are equal to or larger than the common check threshold value, and setting the current limit value individually by a limited minimum selection when at least one of the independent current limit values of the systems is smaller than the common check threshold value.

3. The steering control apparatus according to claim 1, wherein:
the current limitation unit sets the common check threshold value to a same value as that of the automatic steering mode when the control mode is an override mode, which is a transition mode from the automatic steering mode to the manual steering mode.

4. The steering control apparatus according to claim 1, wherein:
the current limitation unit sets the independent current limit value state or switches the common current limit value state and the independent current limit value state when a vehicle speed is equal to or higher than a vehicle speed check threshold value in the automatic steering mode; and
the current limitation unit sets the common current limit value state when the vehicle speed is lower than the vehicle speed check threshold value in the automatic steering mode.

5. The steering control apparatus according to claim 1, wherein:
the control unit further includes a required torque calculation unit configured to calculate an estimated required steering torque, which is required for steering;
the current limitation unit sets the independent current limit value state when the estimated required steering torque is equal to or larger than a torque check threshold value in the automatic steering mode; and
the current limitation unit sets the common current limit value state when the estimated required steering torque is smaller than the torque check threshold value in the automatic steering mode.

6. The steering control apparatus according to claim 1, wherein:
the current limitation unit changes the current limit value when the current limit value is changed at time of switching the control mode between the common current limit value state and the independent current limit value state.

7. The steering control apparatus according to claim 1, wherein:
the control unit includes a control signal calculation unit configured to generate the control signal by current feedback control; and
the control signal calculation unit differentiates the current feedback control as the current control corresponding to the control mode.

8. The steering control apparatus according to claim 7, wherein:
the rotary electric machine has a plurality of winding sets;
each winding set as well as the driving circuit and the control unit, which are provided in correspondence to the winding set, form one system;
the control signal calculation unit is configured to generate the control signal by independent feedback control using a current detection value of a system when the control mode is the automatic steering mode; and
the control signal calculation unit is configured to generate the control signal by coordinate feedback control, which controls a sum and difference of currents flowing in the plurality of winding sets, by using the current detection values of the first system and the second system when the control mode is the manual steering mode.

9. The steering control apparatus according to claim 8, wherein:
the control signal calculation unit sets the current feedback control to the independent feedback control when the control mode is an override mode, which is a transition mode from the automatic steering mode to the manual steering mode.

10. The steering control apparatus according to claim 1, wherein:
the control unit performs switching of the current control when no steering operation is performed.

11. The steering control apparatus according to claim 1, wherein:
the control unit is configured to calculate the individual value as at least one of an overheat protection current limit value, a power supply voltage reference current limit value, a steering operation speed reference current limit value and a current difference reduction current limit value.

12. The steering control apparatus according to claim 1, wherein
the control unit in the one system further includes a communication unit, and the control unit is configured to transmit the individual current limit value of the one system to the second system via the communication unit.

13. A steering control apparatus for controlling an electric power steering apparatus, which is provided with a rotary electric machine, the steering control apparatus comprising:
a driving circuit provided to drive the rotary electric machine; and
a computer connected to the driving circuit and programmed to control driving of the rotary electric machine by generating a control signal related to driving of the driving circuit and controlling a current flowing in the rotary electric machine, wherein:
the computer is programmed to switch a control mode, which includes a manual steering mode and an automatic steering mode, and differentiate current control in correspondence to the control mode, the manual steering mode configured to control the rotary electric machine in correspondence to a manual steering operation on a steering member of a vehicle, and the automatic steering mode configured to control the rotary electric machine independently of the manual steering on the steering member;

the computer is programmed to set a current limit value for limiting the current flowing in the rotary electric machine;

the computer is programmed to differentiate the current limit value as current control corresponding to the control mode;

the rotary electric machine has a plurality of winding sets;

the driving circuit and the computer are provided in correspondence to each winding set thereby to form one system;

the computer is programmed to calculate an individual current limit value that limits current of the one system, acquire the individual current limit value of a second system and switch a common current limit value state for setting a same current limit value as that of the second system and an independent current limit value state for setting an independent current limit value independently of that of the second system; and the computer is programmed to differentiate a common check threshold value, which is provided to switch the common current limit value state and the independent current limit value state, between the manual steering mode and the automatic steering mode.

14. The steering control apparatus according to claim 13, wherein:

the computer is programmed to generate the control signal by current feedback control; and the computer is programmed to differentiate the current feedback control as the current control corresponding to the control mode.

15. The steering control apparatus according to claim 14, wherein:

the rotary electric machine has a plurality of winding sets;

each winding set as well as the driving circuit and the computer, which are provided in correspondence to the winding set, form one system;

the computer is programmed to generate the control signal by independent feedback control using a current detection value of an first system when the control mode is the automatic steering mode; and the computer is programmed to generate the control signal by coordinate feedback control, which controls a sum and difference of currents flowing in the plurality of winding sets, by using the current detection values of the first system and the second system when the control mode is the manual steering mode.

16. The steering control apparatus according to claim 13, wherein the computer in the one system is programmed to transmit the individual current limit value of the one system to the second system.

* * * * *